(12) United States Patent
Inagaki et al.

(10) Patent No.: US 10,803,660 B2
(45) Date of Patent: Oct. 13, 2020

(54) REAL-TIME COLLISION DEFORMATION

(71) Applicant: DreamWorks Animation LLC, Glendale, CA (US)

(72) Inventors: Yukinori Inagaki, Glendale, CA (US); Arthur Gregory, Sherman Oaks, CA (US)

(73) Assignee: DreamWorks Animation LLC, Glendale, CA (US)

( * ) Notice: Subject to any disclaimer, the term of this patent is extended or adjusted under 35 U.S.C. 154(b) by 58 days.

(21) Appl. No.: 16/177,062

(22) Filed: Oct. 31, 2018

(65) Prior Publication Data
US 2020/0005537 A1 Jan. 2, 2020

Related U.S. Application Data

(60) Provisional application No. 62/692,221, filed on Jun. 29, 2018.

(51) Int. Cl.
*G06T 17/20* (2006.01)
(52) U.S. Cl.
CPC .......... *G06T 17/20* (2013.01); *G06T 2210/21* (2013.01); *G06T 2211/428* (2013.01)

(58) Field of Classification Search
CPC .............. G06T 17/20; G06T 2211/428; G06T 2210/21
USPC ........................................................ 345/419
See application file for complete search history.

(56) References Cited

U.S. PATENT DOCUMENTS

| 6,195,625 B1 * | 2/2001 | Day | G06F 30/15 |
| | | | 703/7 |
| 2007/0097125 A1 * | 5/2007 | Xie | G06T 13/40 |
| | | | 345/473 |

* cited by examiner

*Primary Examiner* — Hai Tao Sun
(74) *Attorney, Agent, or Firm* — Lee, Hong, Degerman, Kang & Waimey PC

(57) ABSTRACT

Systems and methods deforming a mesh of a target object in real-time in response to a collision with a collision object are disclosed. An embodiment includes determining an inwardly deformed position of a first vertex of the mesh based on an intersection point of a boundary associated with the collision object with a ray, the ray connecting a point of an internal element of the target object with a reference position of the first vertex, wherein the inwardly deformed position of the first vertex corresponds to a first deformation magnitude of the first vertex from the reference position to the inwardly deformed position.

24 Claims, 17 Drawing Sheets

REAL-TIME COLLISION DEFORMATION

CROSS-REFERENCE TO RELATED APPLICATIONS

Pursuant to 35 U.S.C. § 119(e), this application claims the benefit of U.S. Provisional Patent Application No. 62/692,221, filed on Jun. 29, 2018, the contents of which are hereby incorporated by reference herein in its entirety.

BACKGROUND

Computer animation and other computer modeling applications combine two-dimensional (2D) or three-dimensional (3D) models of objects or characters and their corresponding programmed or keyframed movement. These models are constructed out of geometrical vertices, faces, and edges in a 3D coordinate system. One form of computer animation involves attaching a 3D model to a transformation hierarchy approximating a skeleton to dictate an object or a character's movement. The skeleton is surrounded by a surface mesh representing the object or character's boundaries. A 3D surface mesh may have a high level of resolution and include polygons, or faces, of various sizes making up the surface of the mesh, and the surface mesh may be shaped and deformed as required by an animator or other operator to achieve a desired result.

In one stage of animation, the surface mesh may be attached to various points of a control hull, otherwise referred to as a cage, to allow an animator to perform additional deformations of the surface mesh of the character. The cage may be made up of a large number of control points which allow an animator or other operator to control deformation or movement of the surface mesh during a particular sequence, pose, or gesture. The association of the control points and the selected points of the surface mesh may be automated or performed manually to optimize a desired deformation effect.

In creating a character animation, the response of the character to collisions with other objects, other characters, or even other portions of the same character itself, are vital to maintaining the sense of realism. This includes consideration of secondary effects of collisions on the character, such as surface deformation and surface bulging resulting from the collisions. However, existing solutions have been unable to achieve the desired results in real time. Simulations of such effects are computationally expensive, are not stable, and are not frame-independent presenting issues with frame coherence where certain portions of a deformed surface appear to suddenly "pop" from one position to another.

Thus, the existing systems and methods are unable to provide a solution for quickly and accurately determining collision deformations of a character in real-time. A solution for real-time deformations in response to collisions with collision objects would present significant improvements in the functioning of animation computer systems by providing real-time mesh deformations which are frame-independent with improved computation time and load, while maintaining the appearance of volume preservation in the character model without having to rely on full simulations. Therefore, it may be advantageous to determine deformation of a set of points in real-time resulting from collisions while preserving volume of the deformed mesh.

SUMMARY

Embodiments of the present disclosure include systems, methods, and computer-readable media for determining a set of points for vertices of a mesh of a target object in real-time in response to a collision with an object. In some embodiments, the determined set of points may be based on an intersection point of the collision object with a ray connecting a reference position of each vertex with a corresponding stable point on a bone internal to the mesh. In some embodiments, an inflated boundary of the collision object may be used to determine the intersection point to provide a smooth falloff of the collision deformation. In some embodiments, vertices surrounding the collision object may be deformed outward to provide a bulging effect to provide the appearance preserving volume of the mesh.

An embodiment of a method of the present disclosure for deforming a mesh of a target object in real-time in response to a collision with a collision object includes determining an inwardly deformed position of a first vertex of the mesh based on an intersection point of a boundary associated with the collision object with a ray, the ray connecting a point of an internal element of the target object with a reference position of the first vertex, wherein the inwardly deformed position of the first vertex corresponds to a first deformation magnitude of the first vertex from the reference position to the inwardly deformed position. Some embodiments further include determining a second deformation magnitude of a second vertex of the mesh based on the first deformation magnitude, a surface geodesic distance between a reference position of the second vertex and the reference position of the first vertex, and a bulge magnitude based on the surface geodesic distance.

An embodiment of a machine-readable non-transitory medium of the present disclosure includes machine-readable non-transitory medium having stored thereon machine-executable instructions for deforming a mesh of a target object in real-time in response to a collision with a collision object, the instructions comprising determining an inwardly deformed position of a first vertex of the mesh based on an intersection point of a boundary associated with the collision object with a ray, the ray connecting a point of an internal element of the target object with a reference position of the first vertex, wherein the inwardly deformed position of the first vertex corresponds to a first deformation magnitude of the first vertex from the reference position to the inwardly deformed position. Some embodiments further include instructions for determining a second deformation magnitude of a second vertex of the mesh based on the first deformation magnitude, a geodesic distance between a reference position of the second vertex and the reference position of the first vertex, and a bulge magnitude based on the geodesic distance.

An embodiment of a system of the present disclosure for deforming a mesh of a target object in real-time in response to a collision with a collision object includes one or more controllers configured to determine an inwardly deformed position of a first vertex of the mesh based on an intersection point of a boundary associated with the collision object with a ray, the ray connecting a point of an internal element of the target object with a reference position of the first vertex, wherein the inwardly deformed position of the first vertex corresponds to a first deformation magnitude of the first vertex from the reference position to the inwardly deformed position. In some embodiments, the one or more controllers may further be configured to determine a second deformation magnitude of a second vertex of the mesh based on the first deformation magnitude, a geodesic distance between a reference position of the second vertex and the reference position of the first vertex, and a bulge magnitude based on the geodesic distance.

An embodiment of a system of the present disclosure for deforming a mesh of a target object in real-time in response to a collision with a collision object includes means for determining an inwardly deformed position of a first vertex of the mesh based on an intersection point of a boundary associated with the collision object with a ray, the ray connecting a point of an internal element of the target object with a reference position of the first vertex, wherein the inwardly deformed position of the first vertex corresponds to a first deformation magnitude of the first vertex from the reference position to the inwardly deformed position. Some embodiments may further include means for determining a second deformation magnitude of a second vertex of the mesh based on the first deformation magnitude, a geodesic distance between a reference position of the second vertex and the reference position of the first vertex, and a bulge magnitude based on the geodesic distance.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

Figure 1A:
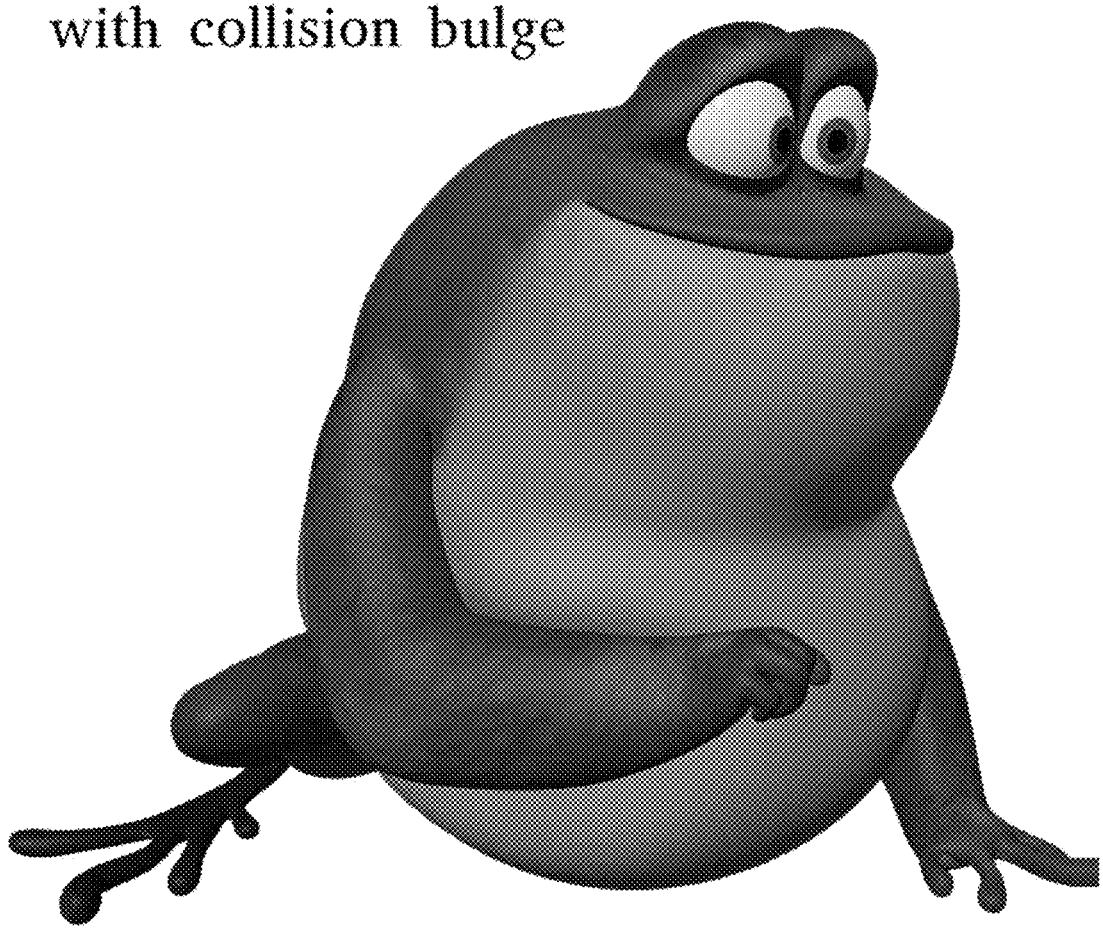
FIGS. 1A, 1B, 1C are illustrations of a character model and mesh according to embodiments of the present disclosure.

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system, method, and computer-readable medium for performing real-time deformations of a mesh of a target object in response to a collision with a collision object. Some embodiments may apply a limit model to certain portions of the mesh which are designated for collision deformations. In some embodiments, an inflated outer boundary may be determined and used for the collision to determine deformation positions of vertices of the mesh to provide a smooth deformation falloff surrounding the collision location. In some embodiments, a set of vertices surrounding the collision position may be bulged outwardly to maintain the appearance of volume preservation of the mesh. In embodiments, the mesh may include a predefined bulge profile curve defining a bulge magnitude of each outwardly deformed vertex based on pre-calculated reference distances to each vertex deformed inward by the collision. In these embodiments, the bulge profile curve may be defined by a user such as an animation artist.

While this disclosure is presented in the context of 3D animation applications, it is not limited thereto, and other implementations of the systems, media, and methods described herein are contemplated, including deformation of geometric models within a 2D or 3D coordinate system, as well as for various interactive geometric modeling applications involving production and modification of geometric models, including, but not limited to, rigging, animation, architecture, automotive design, consumer product design, virtual reality applications, augmented reality applications, game development, visual effects, 3D printing, and the like. Any reference in this disclosure to a geometric model or components thereof, within a 3D model or 3D space will be understood to include the disclosure as applicable to 2D models and 2D spaces.

In this disclosure, the term "character," "object," or "model" may include any suitable computer representation or geometric model of part or all of an entity, such as a character, a landscape, an inanimate object, or any other virtual, modeled, and/or animated entity. Objects may be constructed, for example, out of geometrical vertices, edges, and/or faces in a 2D or 3D coordinate system.

A "point," "vertex," "edge," or "component" may include one of a set of elements used to determine the shape, movement, appearance, and/or absolute or relative positioning of a 3D model, including but not limited to vertices, points, edges, and faces of a 2D or 3D model. Any description of the present disclosure with respect to one of a point, a vertex, an edge, or a face will be understood to apply equally and/or analogously to the others of a point, a vertex, an edge, or a face where applicable, as will be understood by one of ordinary skill in the art, and use of one term over another within this disclosure will not be deemed to be limiting to only the term being used.

FIG. 1A shows an example of an animation character which may be deformed in response to a collision using embodiments of the present disclosure.

Figure 1B:
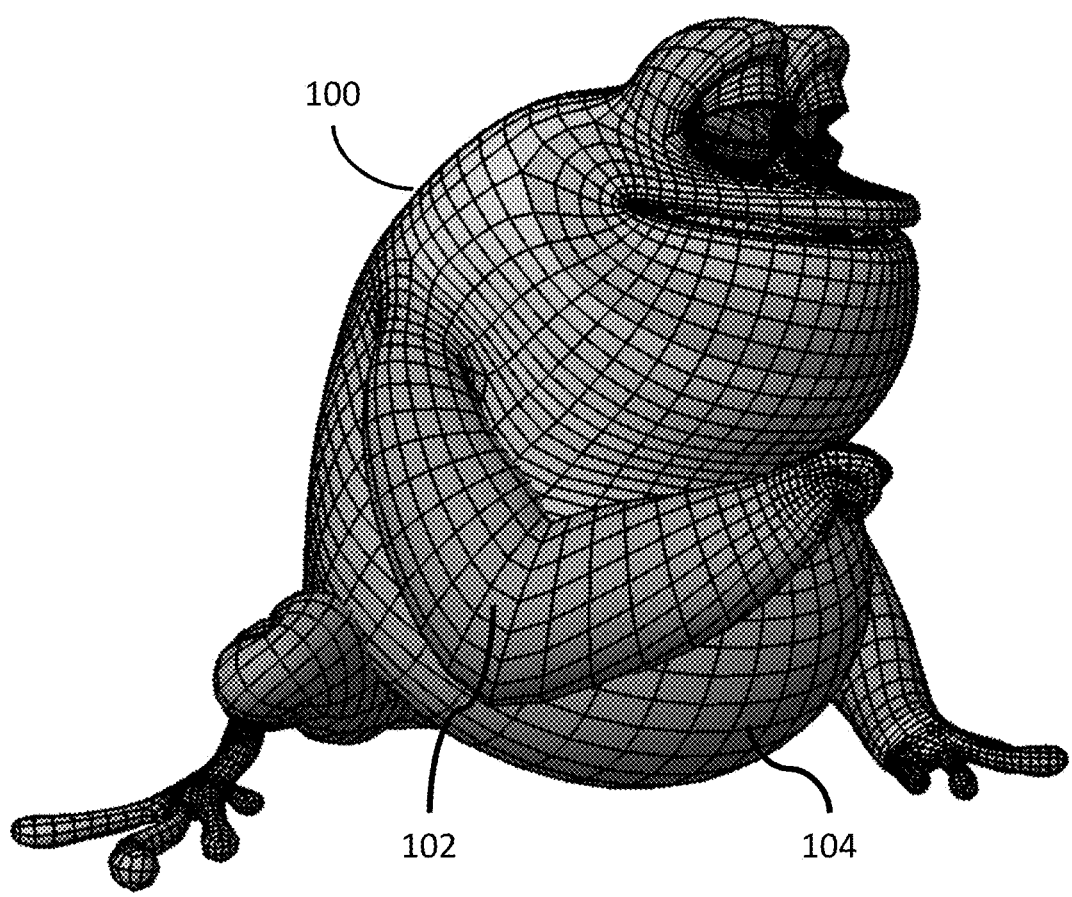

FIG. 1B is an example of a mesh 100 comprising examples vertices which define a surface of the mesh. The mesh may be comprised of a large number of vertices, and regions corresponding to increased movement and deformation may have a higher concentration of vertices of the mesh.

Figure 1C:
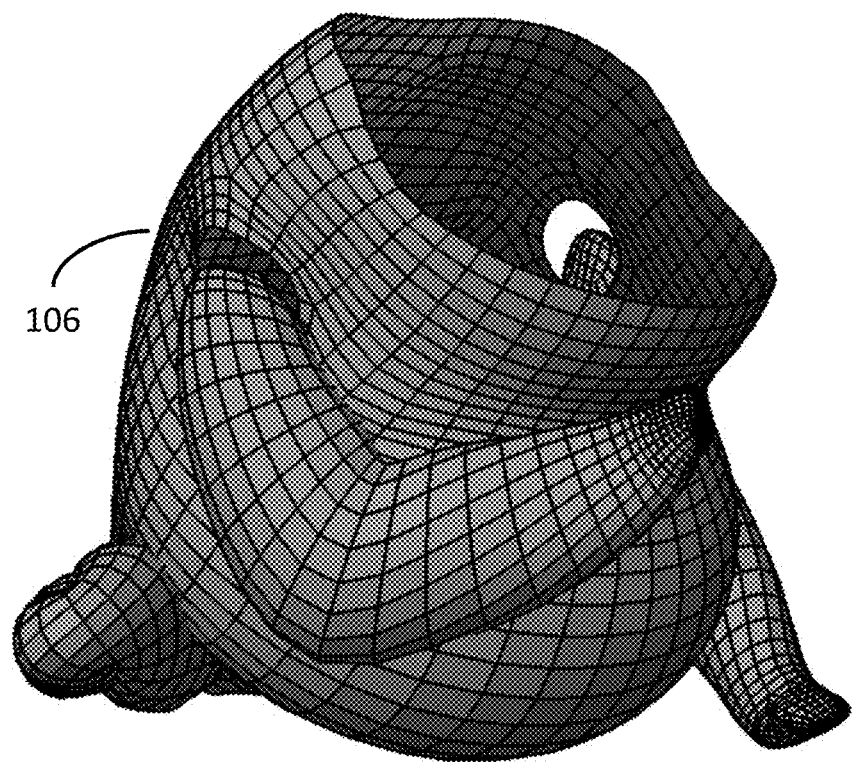

In one example, the mesh of the character corresponding to the softer belly area 104 and arms 102 of the character may be deformed by the collision objects corresponding to the arms and legs using embodiments of the present disclosure. The limit model may not be applied at other areas such as the head and face since a desired deformation range of the mesh at these locations may be decreased due to the firmness and underlying structure of the defined character. An example of selective application of the limit model to particular portions of the mesh is shown in FIG. 1C. In some embodiments, the limit model and bulge operators (discussed further below) may be applied to the entire mesh. In other embodiments, the limit model and bulge operators may be applied only to selected regions 106 of the character which are predefined to have a particular degree of movement or deformation range. In other embodiments, the limit model and bulge operators may be applied to regions of the character model which are selected by a user, such as an animation artist, to achieve a desired artistic effect associated with the particular character.

In yet other embodiments, the artist may selectively apply different limit models and different bulge operators to different regions of the mesh to allow the mesh to react and deform differently to collisions with objects at different body parts. For example, different limit models and different bulge operators may be applied to the belly of the character as compared with the arm of the character such that the belly appears softer and more penetrable during collisions than the arm of the character.

Figure 2A:
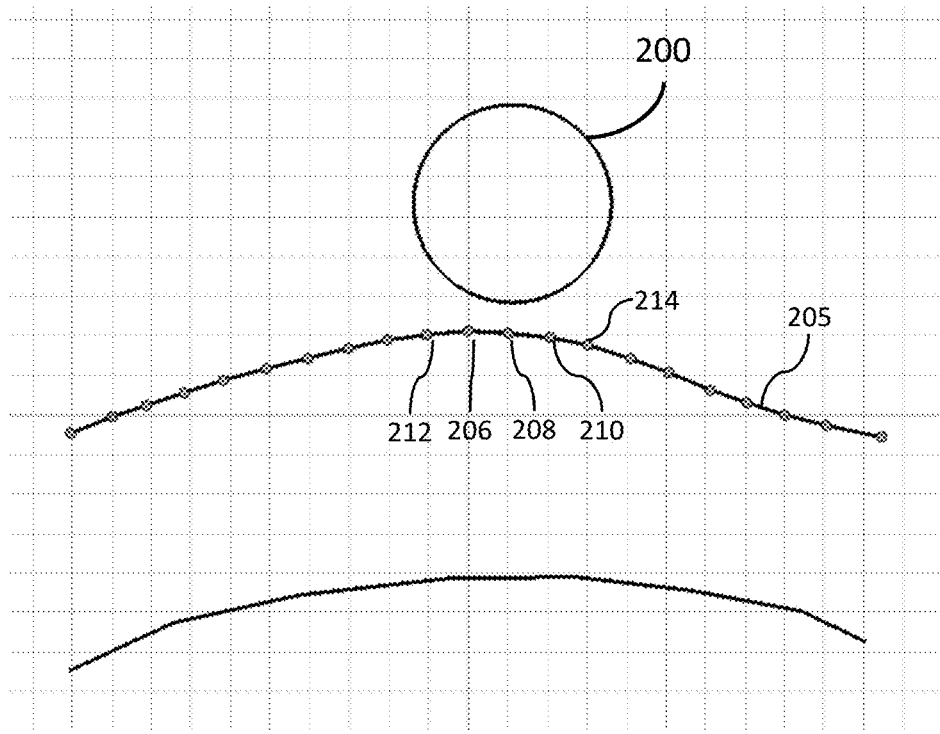
FIGS. 2A, 2B, 2C, 2D are illustrations of collision deformation according to the existing art.

Referring to FIGS. 2A, 2B, 2C, 2D, a simplified example of a collision deformation is shown. Referring to FIG. 2A, when a collision between a collision object 200 and the mesh 205 is detected, for each of the vertices 206, 208, 210, 212, 214 of the mesh 205, a displacement position for each vertex is determined by identifying a point on the surface of the collision object 200 that is closest to the original mesh position of the vertex, also referred to as a "reference position,"—for example the position of the vertex before any inward or outward deformations are applied.

In some examples, the mesh 205 may correspond to a portion of a character's body, such as a belly portion of the mesh 100 in FIG. 1B. The collision object 200 in the example shown in FIGS. 2A-2D may correspond to another part of the character's body, such as a cross-section of the forearm, which is coming into contact with the character's belly, as shown in the example of FIG. 1A. In other examples, the collision object 200 may correspond to an external object separate from the character, such as another character, a stationary object, a moving object, or the like.

Figure 2B:
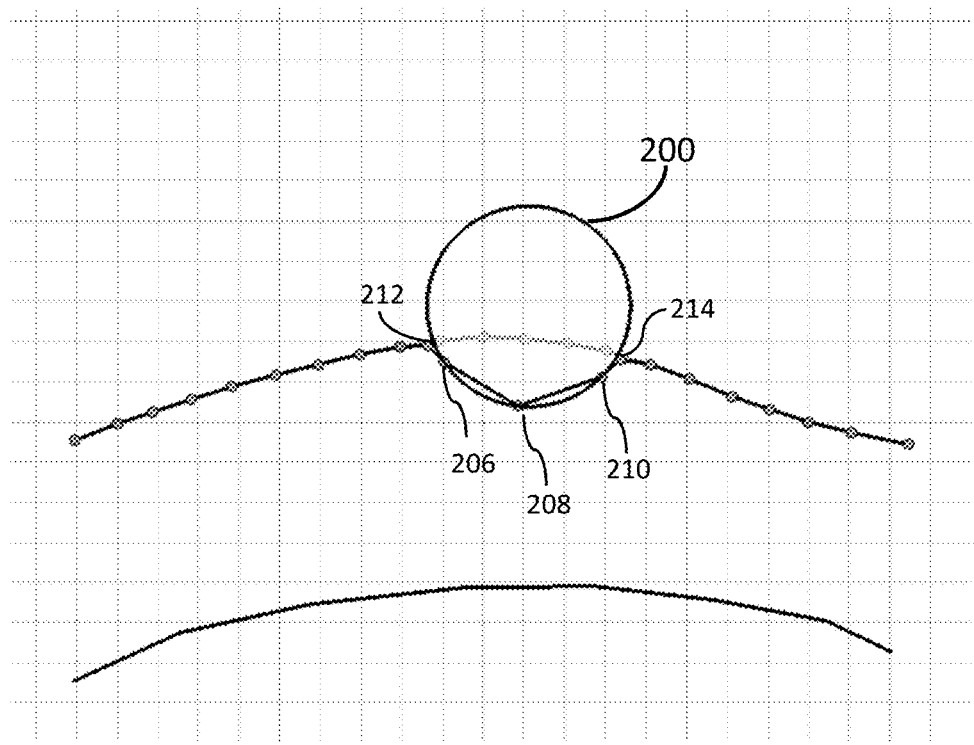

As the object collision progresses deeper into the surface of the mesh 205, this may result in some of the vertices of the mesh being pushed apart and separated into closely positioned groupings on the sides of the collision object, for example 212, 206 and 214, 210, accompanied by a significant increase in distance between a few of the vertices positioned near the middle of the collision event, for example 206, 208, 210, as shown in FIG. 2B.

Figure 2C:
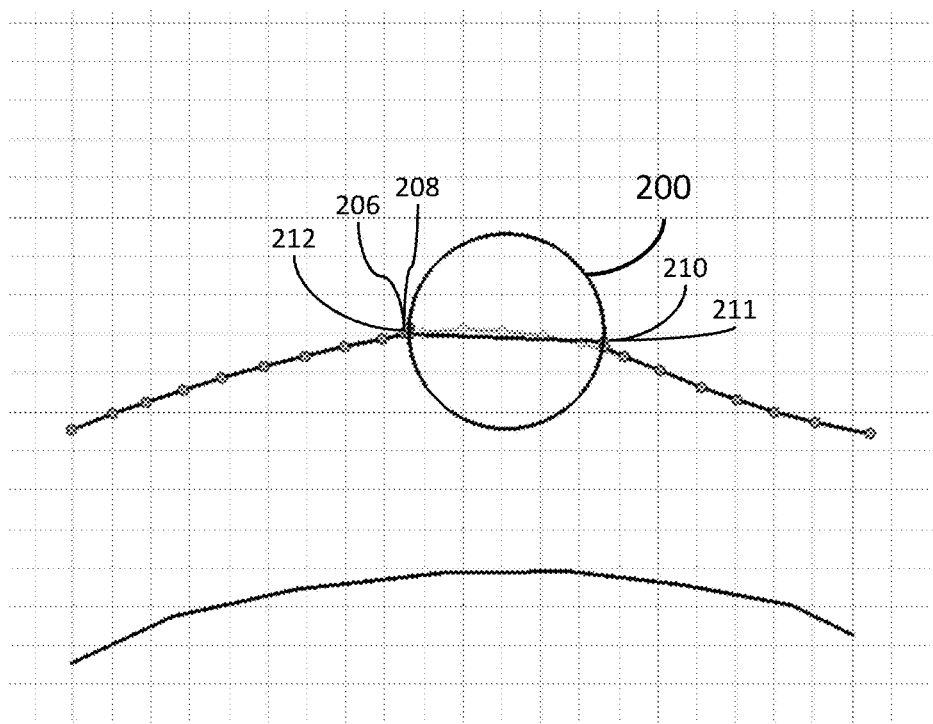

In some cases, all of the vertices may be positioned at either side of the collision object 200, as shown in FIG. 2C, with a distance between two vertices of the mesh, for example 208 and 210, being stretched to a length similar to a diameter of the collision object 200. This may result in an undesirable effect known as "popping" where the vertices suddenly shift positions between frames due to a drastic repositioning of the vertices along the surface of the collision object 200 based solely on a "closest position" determination from the original reference position of each vertex.

Figure 2D:
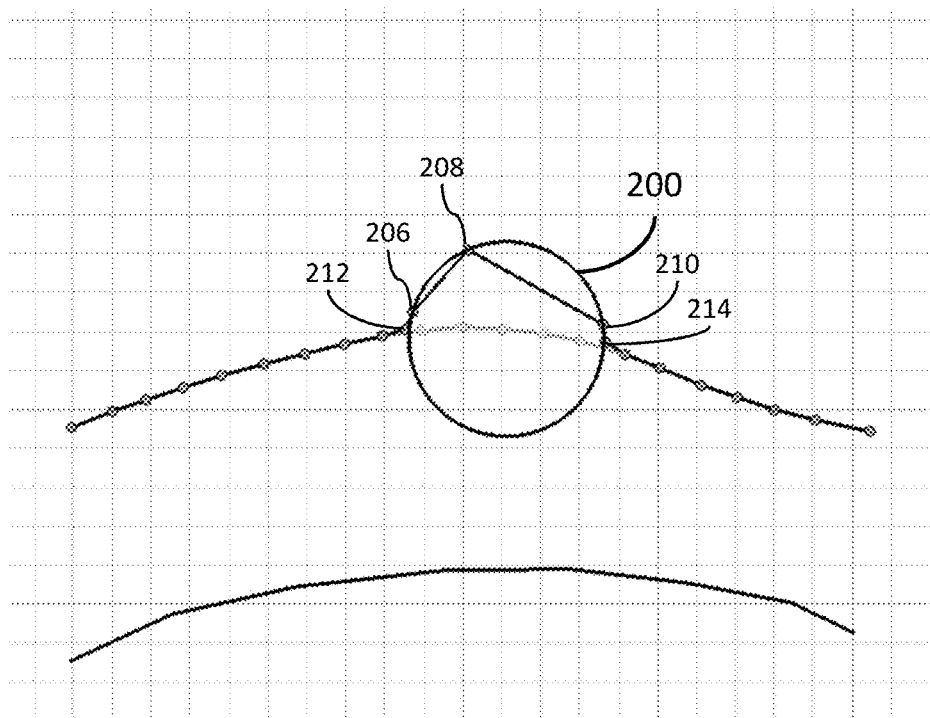

In some cases, the depth of the collision may cause one or more vertices, for example 208, of the mesh to pop up to an upper surface of the collision object 200 as shown in FIG. 2D, since the distance from the corresponding reference position of each vertex to the upper surface of the collision object 200 may be closer reference position than the distance from the corresponding reference position of each vertex to the lower surface of the collision object 200. As can be seen in FIG. 2D, this may result in undesirable artifacts which cause one or more vertices, for example 208, to suddenly pop up and over the lower surface of the collision object 200, which fails to provide a realistic deformation corresponding to the collision.

Figure 3A:
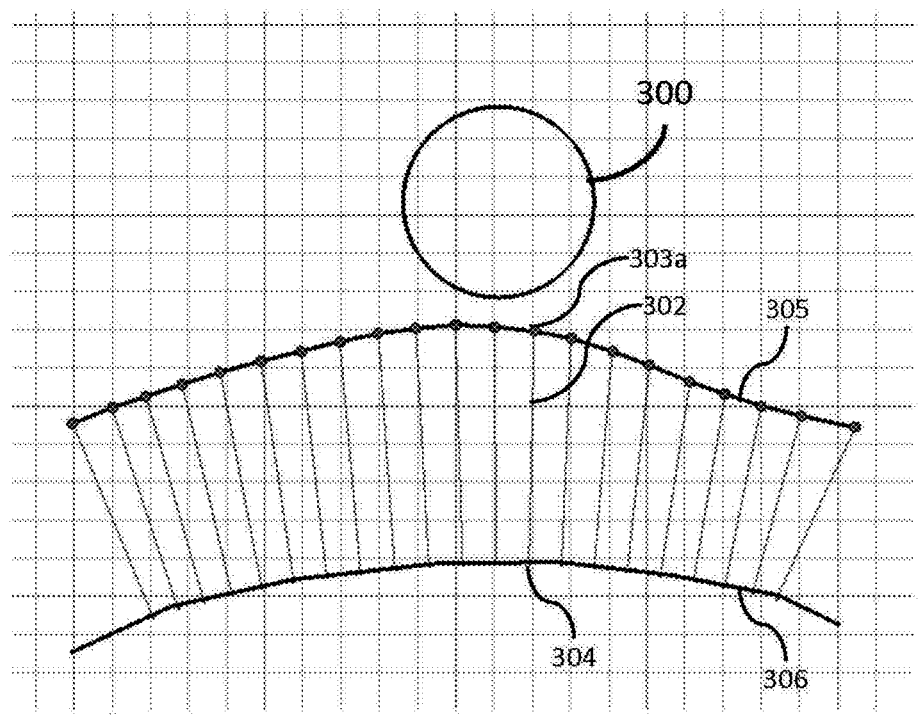
FIGS. 3A, 3B, 3C, 3D are illustrations of collision deformation according to embodiments of the present disclosure.

FIGS. 3A, 3B, 3C, 3D illustrate collision deformation according to embodiments of the present disclosure. Referring to FIG. 3A, each vertex of the mesh 305 may be limited in potential displacement positions resulting from the collision with collision object 300. As shown in FIG. 3A, embodiments of the present disclosure may include defining or obtaining rays, for example 302, connecting reference positions of each vertex, for example 303*a*, of the mesh 305 to a corresponding stable point, for example 304, located on an interior curve 306 of the character. For the sake of simplicity, only single examples of a vertex 303*a*, stable point 304, and ray 302 may be discussed, however it will be understood by those of ordinary skill that the same or similar disclosure will apply to additional similar elements not specifically referenced. In one aspect, the interior curve 306 may correspond to the surface of a bone within the character. In another aspect, the interior curve 306 may correspond to another structural element of an internal hierarchy of the character.

In some aspects, the rays 302 between the vertices 303*a* of the mesh 305 and the stable points 304 of the underlying bone or other structural element 306 may be defined and utilized for deforming the character in other respects. In other embodiments, the rays 302 connecting the vertices 303*a* to the corresponding stable point(s) 304 may be defined specifically for the purposes of the collision deformation limit model, and may be adjusted by a user such as an animation artist to achieve a desired effect in the mesh during collisions.

Figure 3B:
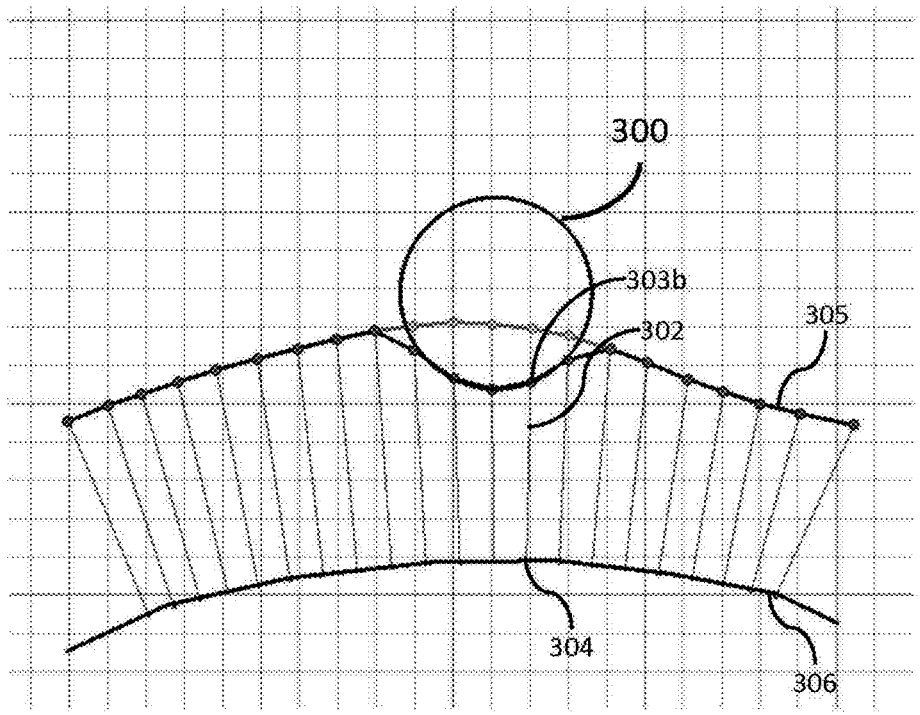

As discussed, in embodiments of the present disclosure, the deformation position of each vertex 303*a* of the mesh 305 may be determined by identifying an intersection point between a surface of the collision object 300 and the connecting ray 302 for the corresponding vertex 303*a*. As shown in FIG. 3B, as the collision object 300 contacts the surface of the mesh 305, the affected vertices, such as 303*a* of FIG. 3A, are displaced inward to positions 303*b* along the corresponding rays 302 connecting the reference positions of the vertices, such as 303*a* of FIG. 3A, with the stable points 304 on the interior bone 306. In comparing the displacement of the vertices in FIG. 2B to those in FIG. 3B (relative positions of the collision object 200/300 and mesh 205/305 are identical in these figures), it can be seen in FIG. 3B that the deformed surface of the mesh appears smoother than in FIG. 2B due to controlled displacement positions 303*b* of the affected vertices along the connecting rays 302, thereby avoiding uneven stretching between vertices as shown in FIG. 2B.

Figure 3C:
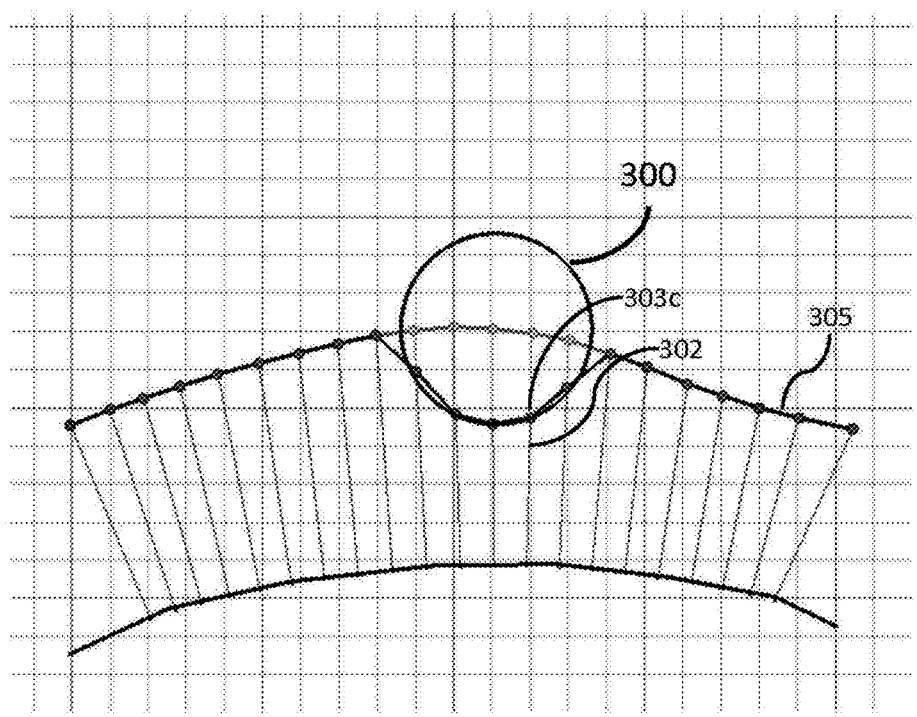
Figure 3D:
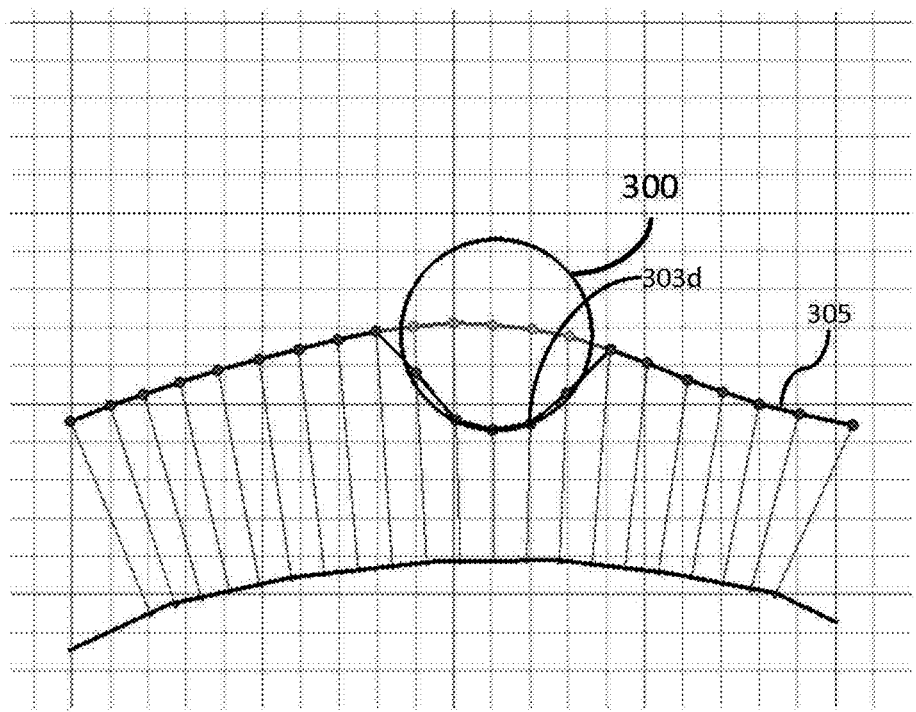

Further, as shown in FIG. 3C, as the depth of the collision progresses, the mesh 305 is further deformed. However, the displacement positions of the vertices, for example at 303*c*, remain limited to the intersection of the collision object surface 300 first intersects with the connecting rays 302 based on the present disclosure. This restricts the popping effect previously discussed with respect to FIG. 2C (FIG. 2C shows the same relative positioning of the collision object 200/300 and mesh 205/305 as FIG. 3C). FIG. 3D shows an additional progression of the collision depth, where a realistic deformation of the mesh 305 is obtained without the popping effect of the vertices 303*d*, as shown in analogous FIG. 2D.

These embodiments may allow for determination of displacement positions of the vertices of the mesh in real-time based on the intersection points of the collision object 300 with the connecting rays 302 of each vertex. These embodiments are also frame-independent as they may provide the ability to determine the displacement positions without requiring information on a position of each vertex in a previous frame since the intersection points between the collision object 300 and the connecting rays 302 may be determined independently from previous vertex positions. Such embodiments may provide for substantial improvements in computational cost and time savings in comparison to relying on full deformation simulations of the existing art.

Embodiments of the present disclosure may also include applying a falloff to the limit model to provide a smoother effect of the mesh deformation, particularly in cases where the collision object 300 is moved along the surface of the mesh 305. In the embodiments discussed above in FIG. 3A-3D, while the displacement positions of the vertices may be determined based on the intersection point of the collision object 300 with the connecting rays 302, undesirable popping artifacts may also be generated when the collision object 300 is moved (e.g., laterally) with respect to the mesh 305.

Figure 4A:
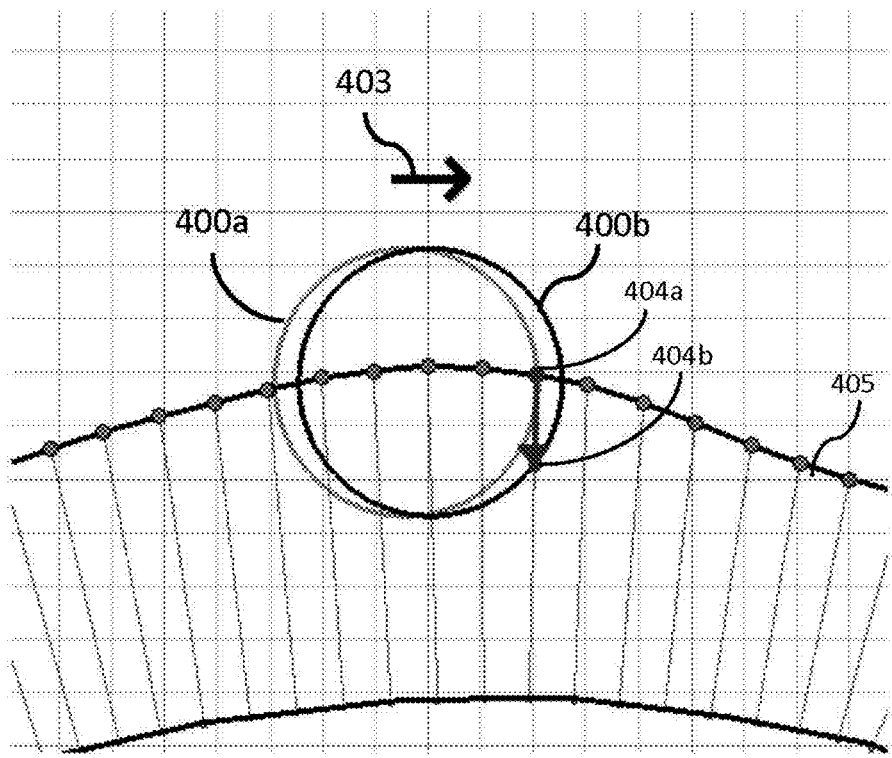
FIGS. 4A, 4B are illustrations of a collision deformation with movement of a collision object according to embodiments of the present disclosure.

For example, referring to FIG. 4A, a mesh 405 is shown in a collision with collision object, shown at 400a in the initial collision position. Based on the embodiments of the present disclosure discussed above, the displacement positions (not depicted) of the vertices of the mesh 405 may be determined based on the intersection points of the collision object 400a with the connecting rays 402 of the vertices, for example 404a. With the exception of vertex 404a/404b, these deformed displacement positions are not shown in FIGS. 4A and 4B for the purposes of discussing the falloff consideration aspect of the present disclosure however it will be understood that the limit model discussed above applies similarly in these examples.

Continuing the example shown in FIG. 4A, referring to the collision object 400a, the displacement position for vertex 404a may remain or be close to the reference position as the collision object 400a intersects with the connecting ray 402 near or at the reference position. However, when collision object 400a is moved in direction 403 to position 400b, the displacement position for the vertex previously located at 404a may be determined at position 404b, resulting in a significant amount of inward movement for the vertex (from 404a to 404b) in one or a few frames of the collision. This may generate an undesired popping effect where the deformation of mesh 405 is not smooth and instead appears jarring and inconsistent due to the significant sudden displacement of the vertices.

To improve smoothness of the mesh deformation, some embodiments of the present disclosure may apply a falloff to the limit model by using an enlarged or inflated outer boundary for the collision object 400a/b by using a virtual collision object surface for determining the displacement positions of the mesh vertices. This enlarged outer boundary may generate a smoother appearance of the deformed character model resulting from the collision and it may also improve the appearance of the character model deformations as a collision object is moved across the mesh, for example when the collision object 400a is moved to position 400b as shown in FIG. 4A.

Figure 4B:
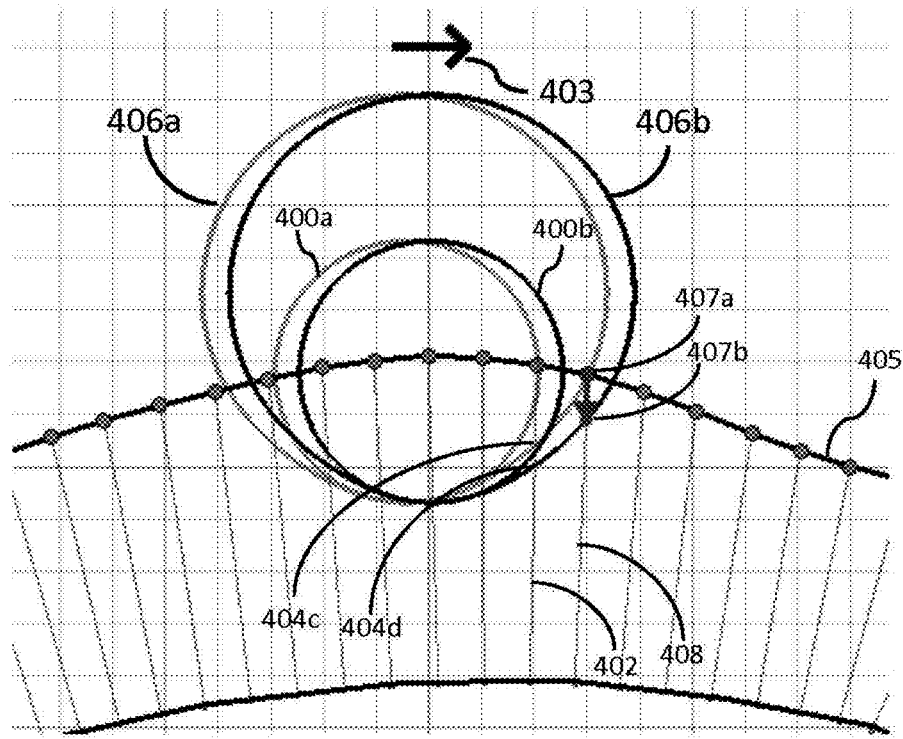

For example, in FIG. 4B, instead of using the true or actual surface of the collision object 400a/b to determine the displacement position of the vertices, an enlarged outer boundary 406a may be defined based on the collision object 400a to determine the displacement positions of the vertices based on the intersection points of the outer boundary 406a with the connecting rays 402, 408.

For example, the vertex which was located at position 404a in FIG. 4A is instead positioned at location 404c in FIG. 4B based on the intersection of the inflated outer boundary 406a with connecting ray 402. Accordingly, when the collision object is moved from position 400a to position 400b, the displacement position of the vertex using the inflated outer boundary 406b is determined to be located at position 404d, instead of position 404b (shown in FIG. 4A). Since the displacement distance between positions 404c and 404d is significantly less than the displacement distance between positions 404a and 404b (shown in FIG. 4A), the collision deformation appears smoother when the collision object is moved from 400a to 400b.

Similarly, the displacement of a vertex that is initially located at its reference position 407a (similar to vertex position 404a in FIG. 4A) upon collision with outer boundary 406a is also made to appear smoother due to application of the falloff. For example, the position of the vertex at position 407a corresponds to the intersection of outer boundary 406a with the connecting ray 408, where 407a is close to the reference position of the vertex, similar to the vertex at 404a in FIG. 4A. However, when the collision object is moved from position 406a to position 406b in direction 403 (similar to FIG. 4A), the displacement position of the vertex may be determined at 407b based on the intersection of moved outer boundary 406b with the connecting ray 408. The result is a smoother deformation of the mesh 405 since the displacement amount between the position of the vertex at 407a and 407b is reduced as compared with the displacement amount between the position of the vertex at 404a and 404b in FIG. 4A, when the collision object 400a/b is moved in direction 403 by a same amount.

Figure 5:
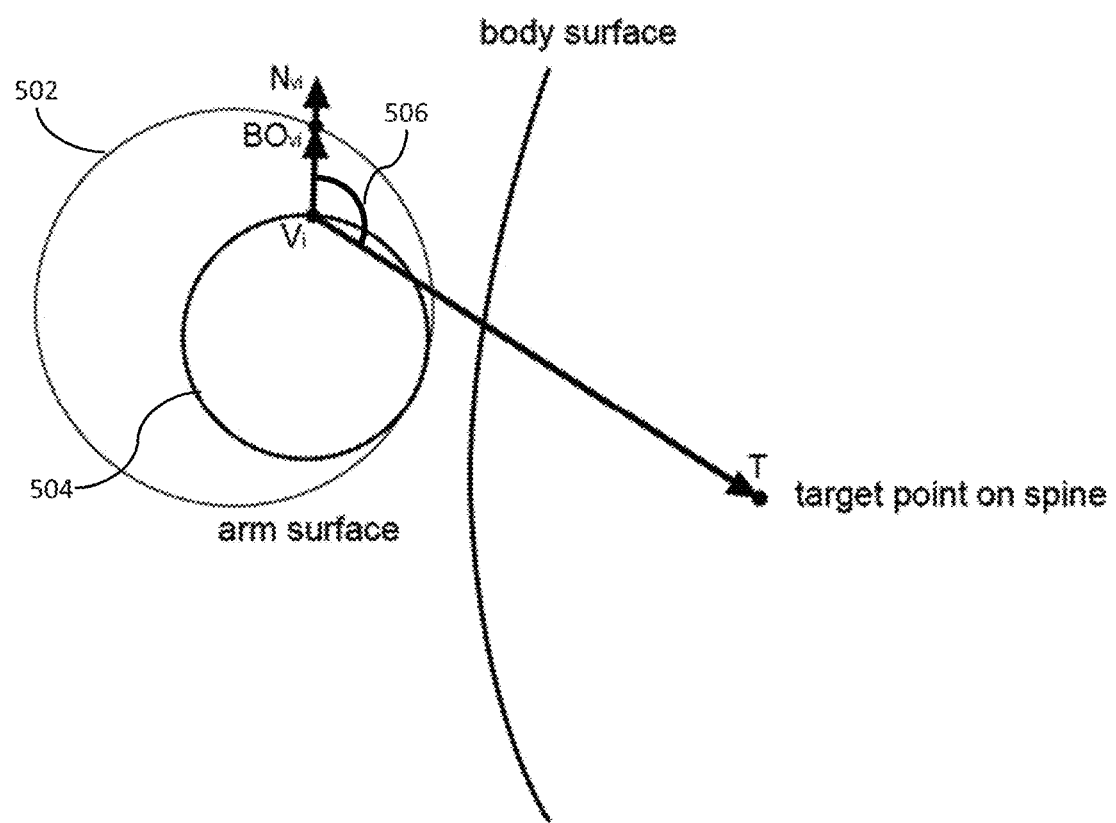
FIGS. 5 and 6 are illustrations examples of collision deformation according to embodiments of the present disclosure.

FIG. 5 illustrates an example for determining the inflated outer boundary 502 based on the collision object 504. In FIG. 5, each vertex, $V_i$, of collision object 504 is inflated along surface normal $N_{vi}$. The offset vector $BO_{vi}$ used to determine a position of vertex $V_i$ on the inflated outer boundary along surface normal vector $N_{vi}$ is computed with the following formula:

$$BO_{vi} = N_{vi} * weight * ((1.0 - (N_{vi} \cdot (T-V_i)/|T-V_i|))/2.0)^{falloff\_exponent}$$

where T is a stable point on an interior curve or a spine joint of the character. The weight may be a value specified by a user such as an animation artist that sets amplitude of the inflation, and the variable "falloff_exponent" defines how fast the inflation is reduced by facing towards the stable point. In some embodiments a falloff_exponent value of 2 or 3 may be considered. As can be seen in FIG. 5, as the angle 506 between vector $V_iT$ and surface normal vector $N_{vi}$ decreases, the amplitude of the inflation decreases. This may generate an appearance of a realistic deformation in the mesh by reducing the falloff at the direct point of contact between the contact object and the mesh, for example in the deformation of the belly of the character shown in FIG. 1 in response to contact with the forearm.

Figure 6:
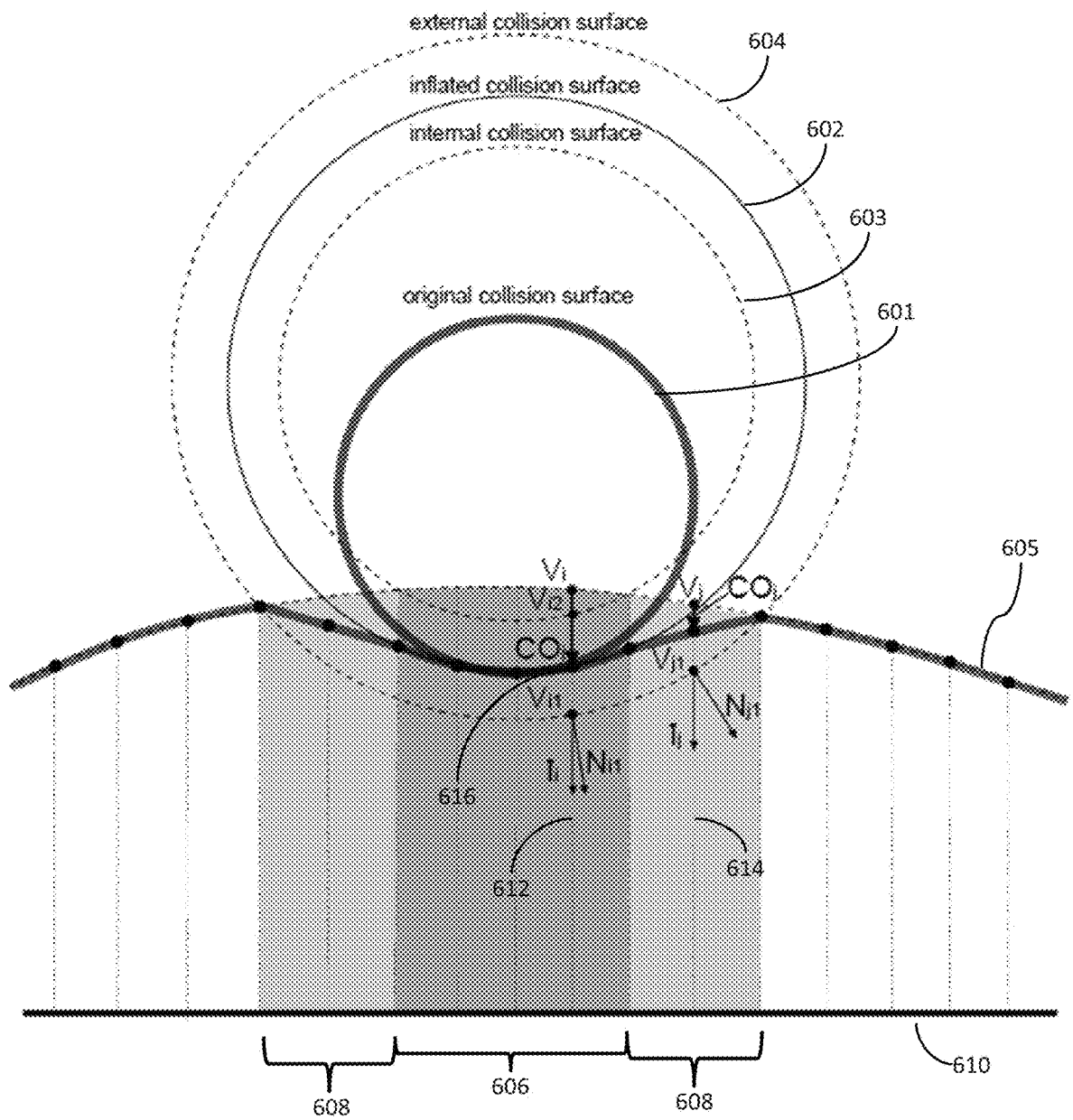

FIG. 6 shows another example of collision falloff determination according to embodiments of the present disclosure. As shown, an additional, or alternative, collision falloff may be applied using an internal collision surface 603 and an external collision surface 604 based on the original inflated collision surface 602. The internal and external surfaces 603, 604 may be generated by offsetting inward and outward each vertex of the original inflated collision surface 602 along surface normal vector by a user input falloff width. In some embodiments, the falloff width may be preset according to a system, automatically generated based on some other user inputs (for example character attributes), or may be predefined based on various other factors of the mesh or associated character.

As shown in FIG. 6, the external collision surface 604 is a collision surface generated by offsetting each vertex of the inflated collision surface 602 outwardly along surface normal by the length of the falloff width. The internal collision surface 603 has the same offset length but along the opposite, inward surface normal.

For this additional collision falloff calculation, it is considered that the average point between the two intersection points represented by: (1) the intersection of the corresponding connecting ray (612, 614) and the external collision surface ($V_{i1}$, $V_{j1}$, respectively) and (2) the intersection of the corresponding connecting ray (612, 614) and either the internal collision surface ($V_{i2}$) or—where the ray does not intersect the internal collision surface—the original mesh surface ($V_i$), provides the corresponding vertex's deformation position, before applying outward and inward offsets-discussed further below. This provides a wider area of influence on the mesh 605 based on the external collision surface 604 while maintaining accurate deformations for the vertices located at or in close proximity to the point of contact with the collision surface.

In further detail, if the connecting ray from the bone or interior curve 610 (also referred to as a core curve) intersects with both the external 604 and the internal collision surface 603 before the original mesh surface at vertex $V_i$ (corresponding to the vertices within range 606 in FIG. 6), the collision offset vector $CO_i$ for vertex $V_i$ may be calculated by the following formula:

$$CO_i=((V_{i1}+V_{i2})/2-V_i)*\text{clamp}((\hat{I}_i \cdot N_{i1}),0,1)$$

where $V_{i1}$ is an intersection of the external collision surface 604 and the connecting ray from the interior curve 610 associated with vertex $V_i$, and $V_{i2}$ is a intersection of the internal collision surface 603 and the connecting ray.

First an offset vector having an initial point, or starting point, at $V_i$ and a terminal point, or ending point, at a middle point between $V_{i1}$ and $V_{i2}$ may be calculated. The offset vector may then be attenuated by the dot product of the normalized ray from $V_{i1}$ to corresponding point on the interior curve, shown in FIG. 6 as $\hat{I}_i$ and surface normal on $V_{i1}$, shown in FIG. 6 as $N_{i1}$. As vector $\hat{I}_i$ and surface normal $N_{i1}$ at $V_{i1}$ are nearly parallel, the attenuation of the offset vector COi will be minimal, resulting in a deformation position 616 very close to the middle point between $V_{i1}$ and $V_{i2}$. In this way, the offset vector is increasingly attenuated and tapered to zero as the normal direction of the collision surface becomes closer to being perpendicular to the direction of collision into the character. Additionally, if the dot product is negative, the offset vector $CO_i$ may be set to (0, 0, 0) by virtue of the clamp function in the equation above to avoid the undesired popping effect of vertices.

Conversely, if the connecting ray from the interior curve intersects only with the external collision surface 604 and does not intersect with the internal collision surface 603 before original mesh surface (corresponding to the vertices within ranges 608 in FIG. 6), the collision offset vector $CO_j$ may be calculated by the following formula:

$$CO_j=((V_{j1}+V_j)/2-*V_j)*\text{clamp}((\hat{I}_j \cdot N_{j1}),0,1)$$

where $V_{j1}$ is a intersection of the external collision surface 604 and the connecting ray from the interior curve 610 associated with vertex $V_j$.

First an offset vector having an initial point, or starting point, at $V_j$ and a terminal point, or ending point, at a middle point between $V_{j1}$ and $V_j$ may be calculated. The offset vector may then be attenuated by the dot product of the normalized ray from $V_{j1}$ to corresponding point on the interior curve, shown in FIG. 6 as $\hat{I}_j$ and surface normal on $V_{j1}$, shown in FIG. 6 as $N_{j1}$. As the angle between vector $\hat{I}_j$ and surface normal $N_{j1}$ is greater than the angle between vector $\hat{I}_i$ and surface normal $N_{i1}$ at $V_{i1}$ in the previous example, the offset vector is attenuated to a higher degree as shown in FIG. 6. If the dot product is negative, offset vector $CO_j$ is set to (0, 0, 0) by virtue of the clamp function in the equation above to avoid the undesired popping effect of vertices.

Accordingly, a smooth falloff may be achieved using the above discussed embodiments, resulting in a gradual deformation of vertices across a wider area of influence surrounding the collision (for example within range 608), while still maintaining accurate deformations for vertices located at or near the point of contact between the mesh and the collision object (for example, within range 606). As discussed, determination of the deformation positions using the offset vectors based on the external and internal collision surface may be used as an alternative to the single inflated outer boundary discussed with respect to FIG. 5, or in some embodiments, it may be used in conjunction with the inflated outer boundary to further improve the deformation falloff.

Other embodiments of the present disclosure may include providing a bulging effect at areas surrounding the collision to provide a volume preservation effect on the mesh.

In some embodiments, an art-directable bulge effect may be generated by pushing vertices surrounding or neighboring the object penetration or collision region out along the surface normal. In one embodiment, a radius around each colliding vertex is computed based on penetration depth to accumulate bulge compensation onto the surrounding vertices. The bulge compensation may be attenuated with a user specified decay-profile-based geodesic distance from the colliding vertex to the bulge vertex. The deeper the penetration, the wider the radius of influence of a colliding vertex over its neighbors. Influence may be smoothly clamped using an arctangent shape curve to avoid over-bulging in extreme poses. In order to deliver real time deformations, the bulge calculations for the each limb may be multi-threaded and the results combined. As another optimization the geodesic distances between each pair of vertices may be precomputed for use with the bulge profile. These embodiments will be discussed further below.

Figure 7:
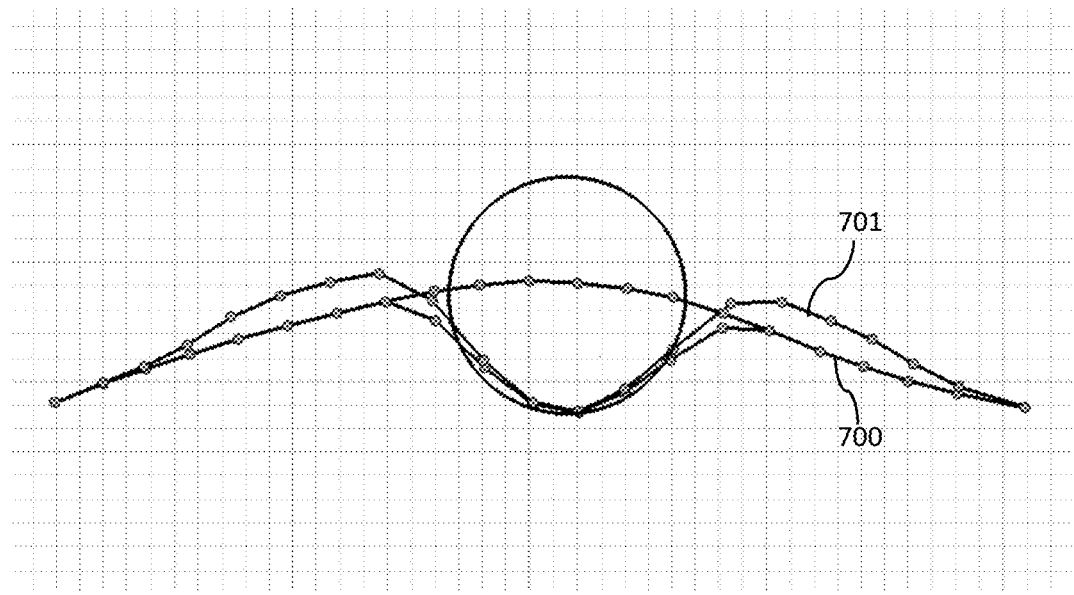
FIGS. 7 and 8A, 8B, 8C, 8D are illustrations of a bulge operator according to embodiments of the present disclosure.

For example, in the character depicted in FIG. 1, the areas of the belly surrounding the contact point between the forearm and the belly may bulge outward in response to the collision, providing a realistic effect and preserving volume of the character due to the inward displacement of the mesh. An example of this bulging effect is shown in FIG. 7, where mesh 700 represents the mesh surface having the affected vertices positioned at inward displacement positions in response to the collision using the embodiments discussed above. By contrast, mesh 701 of FIG. 7 shows the mesh deformed inward in response to the collision, as well as vertices surrounding the collision object displaced outward to create a realistic bulging effect with volume preservation in response to the collision.

An example of an embodiment for achieving a bulging effect is shown in FIGS. 8A-8D. In the example, a vertex 810 is moved to displacement position 810a by displacement magnitude 809 based on the collision with a collision object 800. Based on this displacement, vertices surrounding the displaced vertex may be evaluated to determine whether an outward displacement should apply to provide a bulging effect.

In some embodiments, the limit model may be applied to determine the displacement positions of all vertices deformed inward in response to the collision with the collision object 800. Afterwards, the bulging operations may be applied to determine outward displacement for vertices based on the magnitude of the inward displacements and a defined bulge profile curve (discussed further below). Thus, in these embodiments, the first operation may perform all inward displacements, and the second operation may perform all outward displacements based on the inward displacements.

In other embodiments, the inward and outward displacements may be performed one vertex at a time. For example, the inward displacement of the vertex 810 to the position 810*a* in FIG. 8A may be determined, and immediately thereafter, the outward displacement of all vertices, including 801*a*, 801*b*, 801*c*, 801*d*, 801*e*, 801*f* may be determined based on the single determined inward displacement position 810*a*. After the outward displacements based on the vertex position at 810*a* are determined, another inward displacement position of a second vertex may be determined, and the outward displacements based on the second vertex may be determined.

For the purposes of this discussion, the embodiment where all inward displacements are determined prior to the determination of all outward displacements will be considered. After the inward displacement positions of the vertices are determined, a magnitude 809 of the inward displacement may be considered for each inwardly displaced vertex, for example at 810*a*. Then, for each neighboring vertex (for example, vertices 801*a*-801*f* not in contact with the collision object 800) located within a particular geodesic distance from an inwardly displaced vertex 810*a*, an outward bulge magnitude in a direction normal at the mesh surface is determined from a predefined bulge magnitude based on the surface distance from the considered vertex 810*a*.

Figure 9:
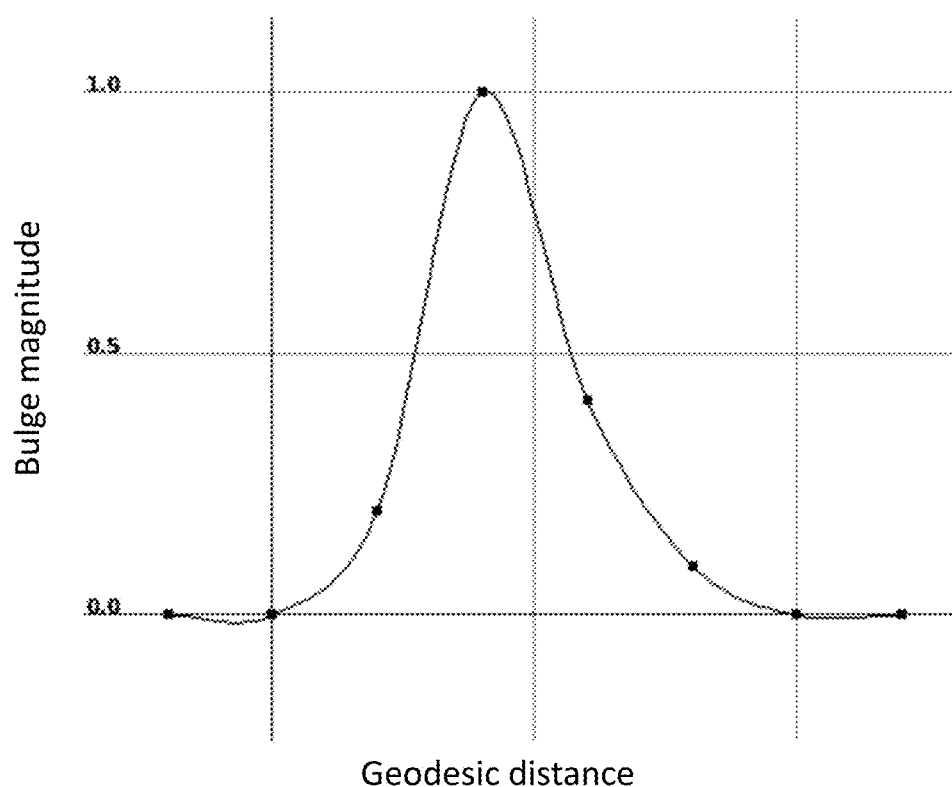
FIG. 9 is an illustration of a bulge profile curve according to an embodiment of the present disclosure.

Accordingly, embodiments of the present disclosure may include a predefined bulge profile curve for application to the bulge operators which defines a magnitude of outward bulge for each neighboring vertex based on a geodesic distance of that neighboring vertex from a currently considered inwardly displaced vertex. For example, FIG. 9 shows an example of a predefined bulge profile curve defining a bulge magnitude (y-axis) for a particular outwardly displaced vertex value based on a geodesic distance of that vertex from a particular inwardly displaced vertex (x-axis). In an optimization aspect, the geodesic distance between vertices of the character model may be determined based on a predefined lookup table which includes information of all vertices in the character model. In other embodiments, the geodesic distance between vertices may be calculated as required and/or in real-time.

The bulge profile curve may be modified, defined, generated, and/or input to a deformation system by a user such as an animation artist to achieve a particular desired deformation effect in a character. In other embodiments, bulge profile curves may be predefined in a system, and the user may have the ability to edit and modify the curve as desired. In other embodiments, multiple profile curves may be predefined based on particular characteristics describing the character or mesh, such as "skinny", "fat", "muscled", "animal", "human", "frog", "belly", "arm", etc. These predefined profile curves may be selected by a user such as an artist, and they may be further edited as desired.

In some embodiments, a single bulge profile curve may be applied to the entire character (or all regions where the limit model and bulge operators are applied—see FIG. 1C). In other embodiments, multiple bulge profile curves may be defined and/or applied to various regions of a single character having different deformation properties to achieve a desired artistic result. Embodiments of the present disclosure considers a user interface in which a user such as an artist may selectively apply a particular bulge profile curve to a region of a mesh by "painting" a region with a cursor or other selection method.

Figure 8A:
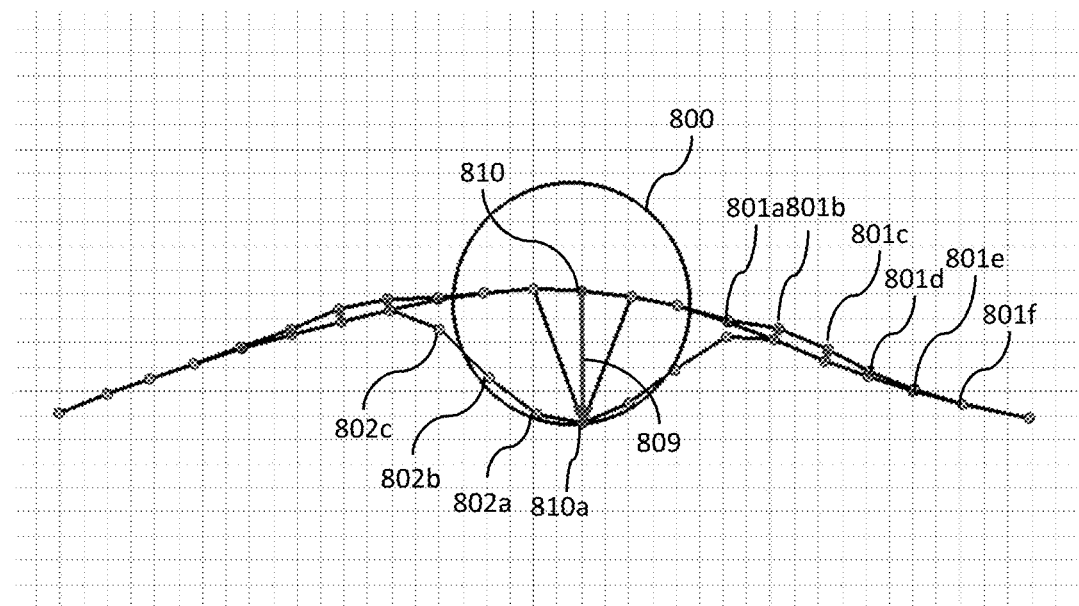

Returning to the example of FIG. 8A, bulge magnitudes of each of the neighboring vertices of vertex 810*a* (for example, 801*a*-801*f*) may be determined based on a bulge profile curve as discussed above. In some embodiments, particularly where the inward displacements are all determined prior to the outward displacements by the bulge operator, the neighboring vertices 802*a*-802*c* may be disregarded by the bulge operator as they have already been determined to be inwardly displaced, and should not be outwardly displaced since they are directly affected by the collision object 800. Thus, the bulge operator may only be applied to neighboring vertices which have not been affected by an inward displacement due to the collision object 800 (for example, vertices 801*a*-801*f*). In other embodiments, the neighboring vertices 802*a*-802*c* may not be displaced outward based solely on the bulge profile curve, for example in FIG. 9, where vertices located within a small distance are assigned a low bulge magnitude value.

Figure 8B:
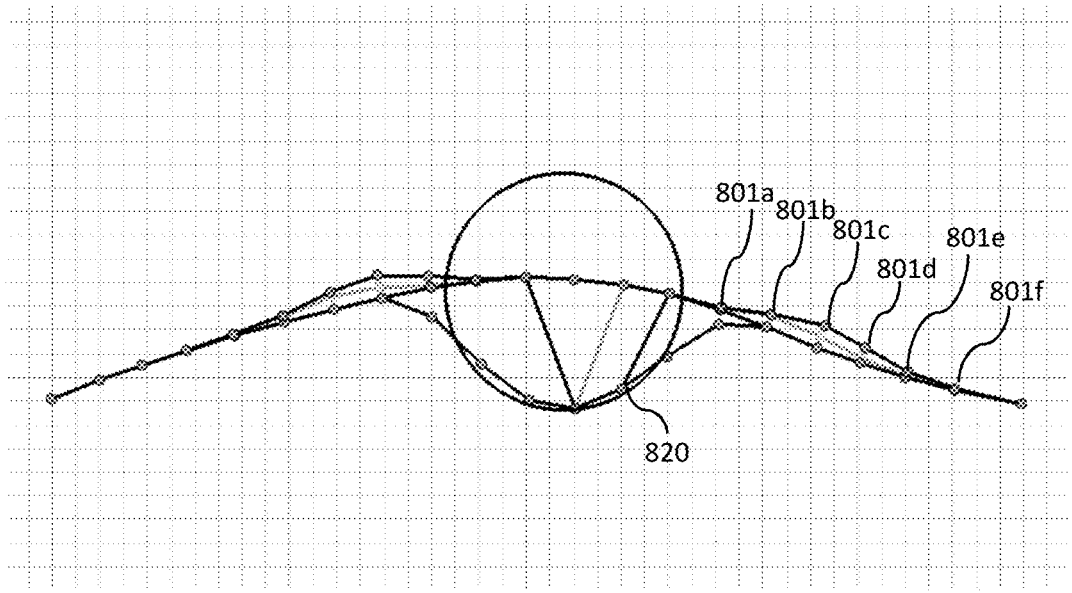
Figure 8C:
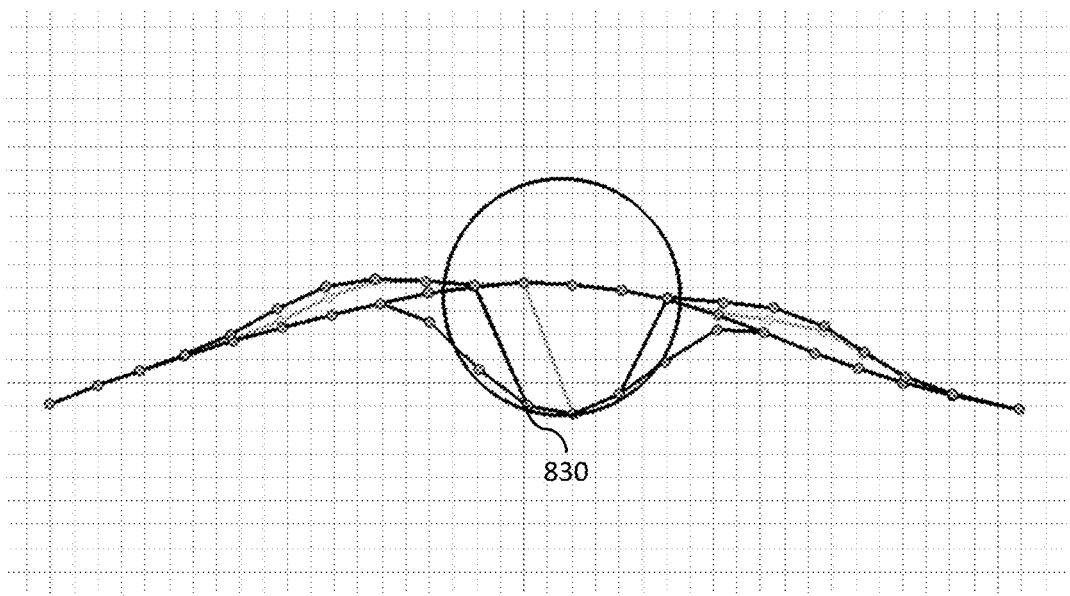
Figure 8D:
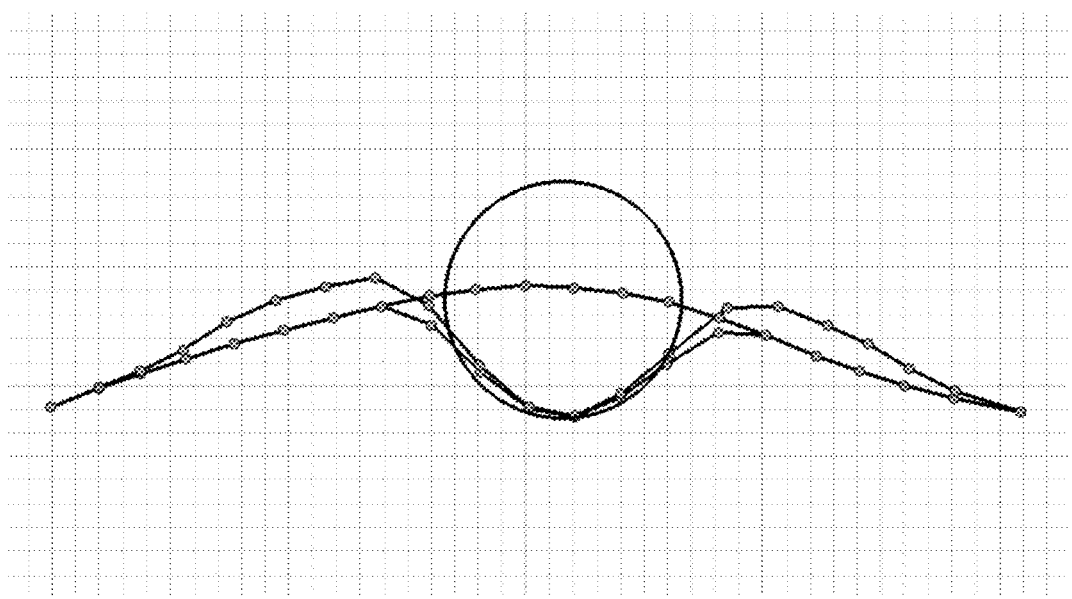

Referring now to FIG. 8B, after the outward displacement magnitudes of neighboring vertices 801*a*-80*f* (and corresponding vertices on the opposite side of collision object 800) have been determined, the bulge operator may consider a next inwardly displaced vertex 820 and repeat the process to determine bulge magnitudes of the neighboring vertices (801*a*-801*f*, and corresponding vertices on opposite side) using the bulge profile curve, this time based on the geodesic distances between displaced vertex 820 and the neighboring vertices (801*a*-801*f*). This process may be repeated for all inwardly displaced vertices, such as 830 as shown in FIG. 8C. Each determined bulge magnitude for a neighboring vertex based on an inwardly displaced vertex is cumulatively added to determine a final outward bulge magnitude for the neighboring vertex. This results in a final outward bulge magnitude which is multiplied by a vector normal at the neighboring vertex to determine an outward displacement position for each neighboring vertex, as shown in FIG. 8D.

The bulge computation may also be represented by the following equation for the bulge offset vector O for a vertex $v_i$ influenced by the other inwardly deformed vertices $V_j$:

$$O_{vi} = N_{vi} * A_{vi} \Sigma_j \text{falloff\_weight}(\text{surface\_distance}(V_i, V_j) / (1 + \|C_{vj}\|)) * C'_{vj}$$

where $$C'_{vj} = M * (a\tan(\|C_{vj}\|/M * Pi/2) * 2/Pi)$$

and $$A_{vi} = 1 - (a\tan(\|C_{vi}\|/M * Pi/2) * 2/Pi)^2$$

In the equations above, the bulge offset vector O for each vertex $v_i$ is computed by multiplying the normal, N, by the sum the falloff weight, calculated from the geodesic distance to every other vertex $v_j$. "falloff\_weight( )" may be defined by the bulge profile curve, which may be defined based on artistic input, as discussed above. $C'_{vj}$ is the collision offset (or inward deformation) magnitude of $C_{vj}$ smoothly clamped by max offset parameter, M, using the arctangent formula, which may prevent too much bulging in extreme poses of a character corresponding to the mesh. In order to avoid bulging vertices pushed in by the collision offset, $C_{vi}$, the bulge is attenuated by $A_{vi}$ based on an artist supplied max offset parameter, M. If $C_{vi}$ is close to max offset M, the $A_{vi}$ be close to 0 and accordingly bulge amount $O_{vi}$ on $V_i$ will be close to 0 since a vertex which is already is pushed in by collision surface should not be bulged outward. $C_{vi}$ is used for attenuating the bulge amount on $V_i$. On the other hand, $C'_{vj}$ is scaling the $V_j$ portion of bulge offset on Vi. The equation may be optimized to ignore $v_j$ with a geodesic distance to $v_i$ greater than the max falloff.

Figure 10:
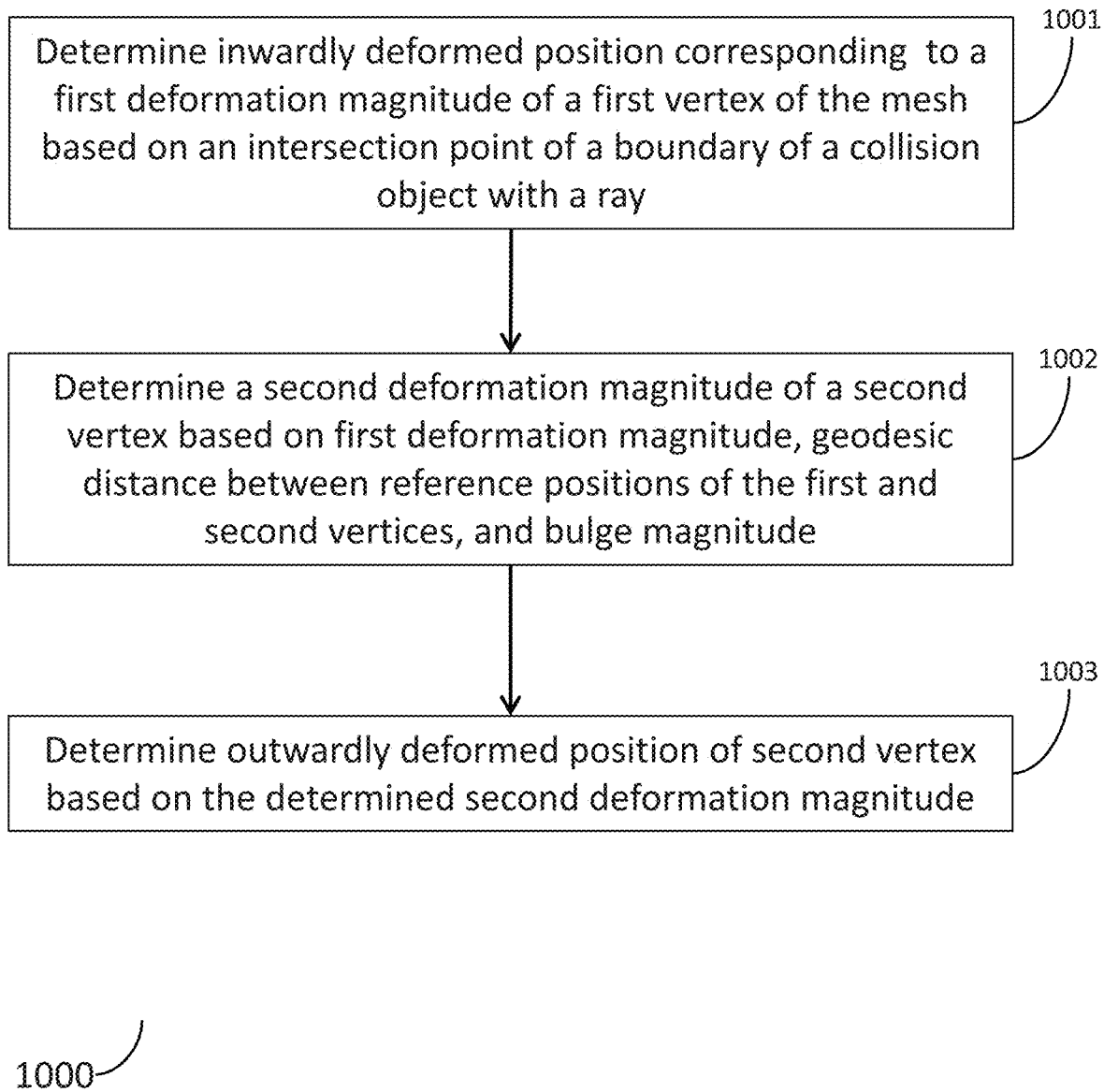
FIG. 10 is a flowchart showing a method according to an embodiment of the present disclosure.

Referring now to FIG. 10, a flowchart 1000 depicting an example of an embodiment of the present disclosure is provided. At block 1001, an inwardly deformed position corresponding to a first deformation magnitude of a first vertex of the mesh is determined based on an intersection point of a boundary of a collision object with a connecting ray. The connecting ray may connect a point of an internal element of the character with a reference position of the first vertex.

As discussed in the examples of FIGS. 3A-3D, the deformation position of each vertex of the mesh may be determined by identifying an intersection point between a surface of the collision object and the connecting ray for the corresponding vertex. As shown in FIG. 3B, as the collision object contacts the surface of the mesh, the affected vertices are displaced inward to positions along the corresponding rays connecting the reference positions of the vertices with the points on the interior bone.

In some embodiments, an inflated outer boundary for the collision object may be determined and used for identifying the intersection point with the connecting rays in order to provide a wider and more gradual falloff for displacement of vertices, particularly for collisions involving movement of the collision object across the mesh. As discussed in the example of FIG. 5, when determining the inflated outer boundary, as the angle between a vector from a point on the collision surface to a point within the interior curve and surface normal vector decreases, the amplitude of the inflation decreases. This may generate an appearance of a realistic deformation in the mesh by reducing the falloff at the direct point of contact between the contact object and the mesh.

In other embodiments, as discussed with respect to FIG. 6, an external collision surface and an internal collision surface may be determined based on the inflated collision surface to provide an alternate or additional falloff for the collision deformations. Thus, a smooth falloff may be achieved, resulting in a gradual deformation of vertices across a wider area of influence surrounding the collision, while still maintaining accurate deformations for vertices located at or near the point of contact between the mesh and the collision object. As discussed, determination of the deformation positions using the offset vectors based on the external and internal collision surface may be used as an alternative to the single inflated outer boundary discussed with respect to FIG. 5, or in some embodiments, it may be used in conjunction with the inflated outer boundary to further improve the deformation falloff.

At block 1002, a second deformation magnitude of a second vertex is determined As based on the first deformation magnitude, a geodesic distance between a reference position of the second vertex and the reference position of the first vertex, and a bulge magnitude based on the geodesic distance. As discussed with respect to FIG. 8A, the bulge magnitude of a neighboring vertex, or a second vertex, of an inwardly displaced first vertex may be based on a bulge profile curve which defines an outward bulge magnitude for the second vertex based at least on the inward first deformation magnitude of the first vertex.

For example, in the examples of FIGS. 8A-8D, after the inward displacement position of the first vertex is determined, for each neighboring vertex—such as the second vertex—located within a particular geodesic distance from the inwardly displaced first vertex, a second deformation magnitude corresponding to an outward bulge magnitude in a direction normal at the mesh surface is determined from a bulge magnitude based on the surface distance between the first vertex and the second vertex. Additionally, the outward bulge magnitude may be based on a bulge profile curve for application to the bulge operators which defines a magnitude of outward bulge for each neighboring vertex—such as the second vertex—based on the first vertex's inward displacement magnitude and a geodesic distance of a reference position of that neighboring vertex from a reference position of the inwardly displaced first vertex.

At block 1003, an outwardly deformed position of the second vertex is determined based on the determined second deformation magnitude. Referring again to the examples of FIGS. 8A-8D, an outward deformation position of a neighboring vertex, or second vertex, is determined to provide a bulging effect, where the outwardly deformed position of the second vertex may be determined by applying the second deformation magnitude in a direction normal from the reference position of the second vertex.

Figure 11:
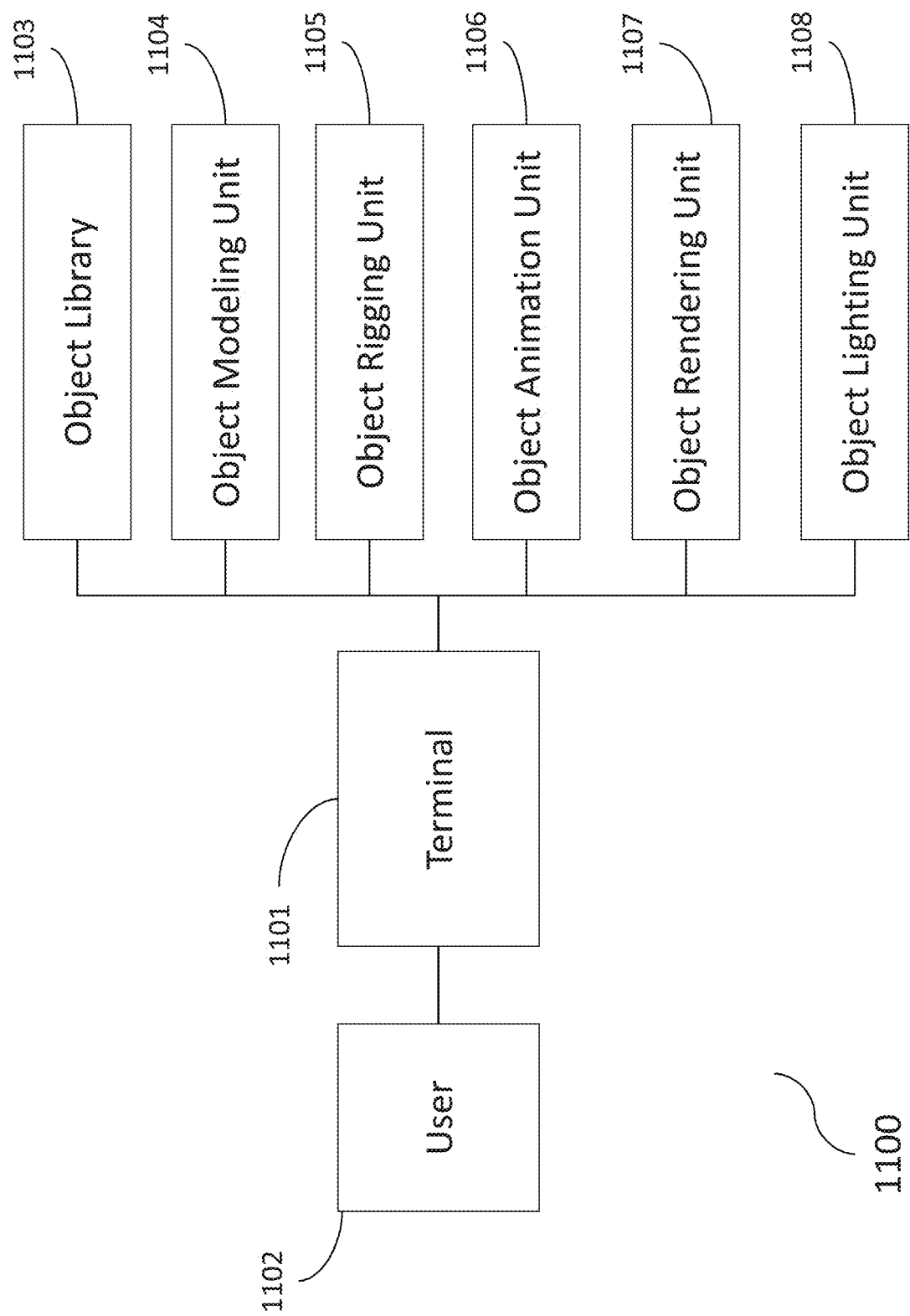
FIG. 11 is a diagram of a system implemented according to an embodiment of the present disclosure.

Referring now to FIG. 11, a simplified block diagram of a system 1100 for creating computer graphics imagery (CGI) and computer-aided animation is shown that may implement or incorporate various embodiments of the present disclosure. The system 1100 may include one or more terminals 1101. The one or more terminals 1101 may include hardware and software elements configured for designing CGI and assisting with computer-aided animation. The terminals 1101 may be implemented as a single computing device or a set of one or more computing devices, corresponding to computer hardware and/or software.

Examples of terminals 1101 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 1101 may be utilized at various stages of a production process, including preproduction, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 1100, a user 1102 may utilize the one or more terminals 1101 to design, create, or modify objects within a computer-generated interface displayed on display associated with the terminal 1101.

The terminal may implement, include, or otherwise be in operable communication with, systems and units including object library 1103, object modeling unit 1104, object rigging unit 1605, object animation unit 1106, object rendering unit 1107, and object lighting unit 1108. Object library 1103 may include software and/or hardware elements configured for storing and accessing information related to objects to be accessed, requested, retrieved, and/or used by the one or more terminals 1101 to design, create, and modify 3D models of objects in the CGI and animation processes.

Object modeling unit 1104 may include software and/or hardware elements and information to be accessed, requested, retrieved, and/or used by the one or more terminals 1101 to sculpt and design the 3D model to take on the desired appearance as instructed by user 1102, or other terminal operator during the CGI and animation process.

Object rigging unit 1105 may include software and/or hardware elements and information to be accessed, requested, retrieved, and/or used by the one or more terminals 1101 to design, create, or modify components of 3D models to define articulation points and movement ranges of various elements of the 3D model.

Object animation unit 1106 may include software and/or hardware elements and information to be accessed, requested, retrieved, and/or used by the one or more terminals 1101 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 1107 may include software and/or hardware elements and information to be accessed, requested, retrieved, and/or used by the one or more terminals 1101 to design, create, or modify a final appearance of the animated 3D model, including generating one or more images of one or more computer-generated objects, including textures, colors, rigging, controls, and the like.

Object lighting unit 1108 may include software and/or hardware elements and information to be accessed, requested, retrieved, and/or used by the one or more terminals 1101 to design, create, or modify lighting aspects of a 3D model and animated scenes, including defining lighting sources, shading, reflections, refractions, textures, colors, and the like.

The one or more terminals 1101 may be in communication with one or more server computers which may operatively in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 1103, object modeling unit 1104, object rigging unit 1105, object animation unit 1106, object rendering unit 1107, object lighting unit 1108, and the like. The one or more terminals 1101, the one or more server computers, or any other aspect of the system 1100, may be associated or coupled with a display configured to display information, including a displayed interface for displaying, performing, executing, instructing, reviewing, and/or selecting operations of the present disclosure.

Figure 12:
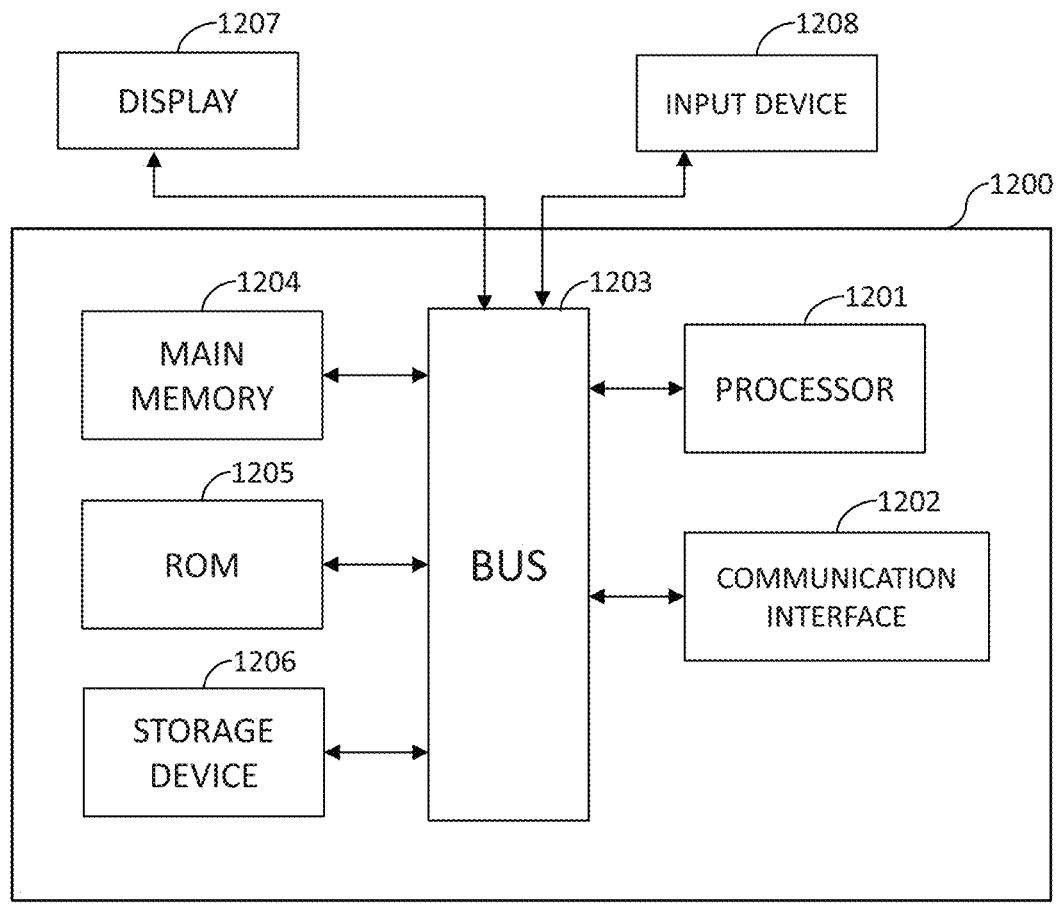
FIG. 12 is a diagram of an apparatus implemented according to an embodiment of the present disclosure.

Referring to FIG. 12, an illustration of an example computer 1200 is provided. One or more of aspects of the system 1100 discussed above in FIG. 10, such as the one or more terminals 1100 or the one or more server computers, may be configured as or include such a computer 1200. In selected embodiments, the computer 1200 may include a bus 1203 (or multiple buses) or other communication mechanism, a processor 1201, main memory 1204, read only memory (ROM) 1205, one or more additional storage devices 1206, and/or a communication interface 1202, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1203 or other communication mechanism, including multiple such buses or mechanisms, may support communication of information within the computer 1200. The processor 1201 may be connected to the bus 1203 and process information. In selected embodiments, the processor 1201 may be a specialized or dedicated microprocessor configured to perform particular tasks in accordance with the features and aspects disclosed herein by executing machine-readable software code defining the particular tasks. Main memory 1204 (e.g., random access memory—or RAM—or other dynamic storage device) may be connected to the bus 1203 and store information and instructions to be executed by the processor 1201. Main memory 1204 may also store temporary variables or other intermediate information during execution of such instructions.

ROM 1205 or some other static storage device may be connected to a bus 1203 and store static information and instructions for the processor 1201. An additional storage device 1206 (e.g., a magnetic disk, optical disk, memory card, or the like) may be connected to the bus 1203. The main memory 1204, ROM 1205, and the additional storage device 1206 may include a non-transitory computer-readable medium holding information, instructions, or some combination thereof, for example instructions that when executed by the processor 1201, cause the computer 1200 to perform one or more operations of a method as described herein. A communication interface 1202 may also be connected to the bus 1203. A communication interface 1202 may provide or support two-way data communication between a computer 1200 and one or more external devices (e.g., other devices contained within the computing environment).

In selected embodiments, the computer 1200 may be connected (e.g., via a bus) to a display 1207. The display 1207 may use any suitable mechanism to communicate information to a user of a computer 1200. For example, the display 1207 may include or utilize a liquid crystal display (LCD), light emitting diode (LED) display, projector, or other display device to present information to a user of the computer 1200 in a visual display. One or more input devices 1208 (e.g., an alphanumeric keyboard, mouse, microphone, stylus pen) may be connected to the bus 1203 to communicate information and commands to the computer 1200. In selected embodiments, one input device 1208 may provide or support control over the positioning of a cursor to allow for selection and execution of various objects, files, programs, and the like provided by the computer 1200 and displayed by the display 1207.

The computer 1200 may be used to transmit, receive, decode, display, or the like one or more video files. In selected embodiments, such transmitting, receiving, decoding, and displaying may be in response to the processor 1201 executing one or more sequences of one or more instructions contained in main memory 1204. Such instructions may be read into main memory 1204 from another non-transitory computer-readable medium (e.g., a storage device).

Execution of sequences of instructions contained in main memory 1204 may cause the processor 1201 to perform one or more of the procedures or steps described herein. In selected embodiments, one or more processors in a multi-processing arrangement may also be employed to execute sequences of instructions contained in main memory 1204. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1201, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1202 may provide or support external, two-way data communication to or via a network link. For example, a communication interface 1202 may be a wireless network interface controller or a cellular radio providing a data communication network connection. Alternatively, a communication interface 1202 may comprise a local area network (LAN) card providing a data communication connection to a compatible LAN. In any such embodiment, a communication interface 1202 may send and receive electrical, electromagnetic, or optical signals conveying information.

A network link may provide data communication through one or more networks to other data devices (e.g., one or more terminals 1101 as shown in the system 1100). For example, a network link may provide a connection through a local network of a host computer or to data equipment operated by an Internet Service Provider (ISP). An ISP may, in turn, provide data communication services through the Internet. Accordingly, a computer 1200 may send and receive commands, data, or combinations thereof, including program code, through one or more networks, a network link, and communication interface 1202. Thus, the computer 1200 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for deforming a mesh of a target object in real-time in response to a collision with a collision object, the method comprising:
    determining an inflated outer boundary of the collision object, wherein the inflated outer boundary is a virtual collision object surface representing an enlarged collision object; and
    determining an inwardly deformed position of a first vertex of the mesh based on an intersection point of the inflated outer boundary of the collision object with a ray, the ray connecting a point of an internal element of the target object with a reference position of the first vertex,
    wherein the inwardly deformed position of the first vertex corresponds to a first deformation magnitude of the first vertex from the reference position to the inwardly deformed position.

2. The method of claim 1, further comprising:
    displaying the first vertex at the inwardly deformed position based on the intersection point of the boundary with the ray,
    wherein the inwardly deformed position of the first vertex is offset from the reference position by the first deformation magnitude.

3. The method of claim 1, further comprising:
    determining a second deformation magnitude of a second vertex of the mesh based on the first deformation magnitude, a geodesic distance between a reference position of the second vertex and the reference position of the first vertex, and a bulge magnitude based on the geodesic distance; and
    determining an outwardly deformed position of the second vertex based on the determined second deformation magnitude.

4. The method of claim 3, wherein the bulge magnitude is predefined in a profile curve assigned to the mesh representing bulge magnitude values for vertices to be outwardly deformed based on geodesic distance values between an inwardly deformed vertex and each of the vertices to be outwardly deformed.

5. The method of claim 1, wherein determining the inflated outer boundary comprises, for each object vertex on a surface of the collision object:
    determining an angle between a first vector from the object vertex to a specific target point of the target object and a second surface normal vector at the object vertex;
    determining an inflation magnitude based on the angle; and determining an inflated position of the object vertex by multiplying the second surface normal vector by the inflation magnitude and adding the inflated position to an original position of the object vertex.

6. The method of claim 5, wherein the inflation magnitude decreases as the determined angle decreases.

7. The method of claim 1, wherein determining the inwardly deformed position of the first vertex comprises:
   determining an inflated outer boundary corresponding to the collision object;
   determining an external collision boundary which is outwardly offset from the inflated outer boundary by a falloff width;
   determining an internal collision boundary which is inwardly offset from the inflated outer boundary by the falloff width; and
   determining an external intersection point at an intersection between the external collision boundary and the ray,
   wherein when the internal collision boundary does not intersect with the ray, the inwardly deformed position of the first vertex is based on a terminal point of an offset vector having an initial point at the reference position and the terminal point at a middle point between the reference position and the external intersection point, and
   wherein when the internal collision boundary intersects with the ray at an internal intersection point, the inwardly deformed position of the first vertex is based on a terminal point of an offset vector having an initial point at the reference position and the terminal point at a middle point between the internal intersection point and the external intersection point.

8. The method of claim 7, wherein the offset vector is attenuated based on a dot product of a ray vector from the external intersection point toward the internal element of the target object and a surface normal vector at the external intersection point, and the inwardly deformed position of the first vertex is at the terminal point of the attenuated offset vector.

9. A machine-readable non-transitory medium having stored thereon machine-executable instructions for deforming a mesh of a target object in real-time in response to a collision with a collision object, the instructions comprising:
   determining an inflated outer boundary of the collision object, wherein the inflated outer boundary is a virtual collision object surface representing an enlarged collision object; and
   determining an inwardly deformed position of a first vertex of the mesh based on an intersection point of the inflated outer boundary of the collision object with a ray, the ray connecting a point of an internal element of the target object with a reference position of the first vertex,
   wherein the inwardly deformed position of the first vertex corresponds to a first deformation magnitude of the first vertex from the reference position to the inwardly deformed position.

10. The machine-readable non-transitory medium of claim 9, further comprising instructions for:
    displaying the first vertex at the inwardly deformed position based on the intersection point of the boundary with the ray,
    wherein the inwardly deformed position of the first vertex is offset from the reference position by the first deformation magnitude.

11. The machine-readable non-transitory medium of claim 9, further comprising instructions for:
    determining a second deformation magnitude of a second vertex of the mesh based on the first deformation magnitude, a geodesic distance between a reference position of the second vertex and the reference position of the first vertex, and a bulge magnitude based on the geodesic distance; and
    determining an outwardly deformed position of the second vertex based on the determined second deformation magnitude.

12. The machine-readable non-transitory medium of claim 11, wherein the bulge magnitude is predefined in a profile curve assigned to the mesh representing bulge magnitude values for vertices to be outwardly deformed based on geodesic distance values between an inwardly deformed vertex and each of the vertices to be outwardly deformed.

13. The machine-readable non-transitory medium of claim 9, wherein determining the inflated outer boundary comprises, for each object vertex on a surface of the collision object:
    determining an angle between a first vector from the object vertex to a specific target point of the target object and a second surface normal vector at the object vertex;
    determining an inflation magnitude based on the angle; and
    determining an inflated position of the object vertex by multiplying the second surface normal vector by the inflation magnitude and adding the inflated position to an original position of the object vertex.

14. The machine-readable non-transitory medium of claim 13, wherein the inflation magnitude decreases as the determined angle decreases.

15. The machine-readable non-transitory medium of claim 9, wherein determining the inwardly deformed position of the first vertex comprises:
    determining an inflated outer boundary corresponding to the collision object;
    determining an external collision boundary which is outwardly offset from the inflated outer boundary by a falloff width;
    determining an internal collision boundary which is inwardly offset from the inflated outer boundary by the falloff width; and
    determining an external intersection point at an intersection between the external collision boundary and the ray,
    wherein when the internal collision boundary does not intersect with the ray, the inwardly deformed position of the first vertex is based on a terminal point of an offset vector having an initial point at the reference position and the terminal point at a middle point between the reference position and the external intersection point, and
    wherein when the internal collision boundary intersects with the ray at an internal intersection point, the inwardly deformed position of the first vertex is based on a terminal point of an offset vector having an initial point at the reference position and the terminal point at a middle point between the internal intersection point and the external intersection point.

16. The machine-readable non-transitory medium of claim 15, wherein the offset vector is attenuated based on a dot product of a ray vector from the external intersection point toward the internal element of the target object and a surface normal vector at the external intersection point, and the inwardly deformed position of the first vertex is at the terminal point of the attenuated offset vector.

17. A system for deforming a mesh of a target object in real-time in response to a collision with a collision object, the system comprising one or more controllers configured to:
  determine an inflated outer boundary of the collision object, wherein the inflated outer boundary is a virtual collision object surface representing an enlarged collision object; and
  determine an inwardly deformed position of a first vertex of the mesh based on an intersection point of the inflated outer boundary of the collision object with a ray, the ray connecting a point of an internal element of the target object with a reference position of the first vertex,
  wherein the inwardly deformed position of the first vertex corresponds to a first deformation magnitude of the first vertex from the reference position to the inwardly deformed position.

18. The system of claim 17, further comprising a display configured to display information, wherein the one or more controllers are further configured to:
  cause the display to display the first vertex at the inwardly deformed position based on the intersection point of the boundary with the ray,
  wherein the inwardly deformed position of the first vertex is offset from the reference position by the first deformation magnitude.

19. The system of claim 17, wherein the one or more controllers are further configured to:
  determine a second deformation magnitude of a second vertex of the mesh based on the first deformation magnitude, a geodesic distance between a reference position of the second vertex and the reference position of the first vertex, and a bulge magnitude based on the geodesic distance; and
  determine an outwardly deformed position of the second vertex based on the determined second deformation magnitude.

20. The system of claim 19, wherein the bulge magnitude is predefined in a profile curve assigned to the mesh representing bulge magnitude values for vertices to be outwardly deformed based on geodesic distance values between an inwardly deformed vertex and each of the vertices to be outwardly deformed.

21. The system of claim 17, wherein for determining the inflated outer boundary for each object vertex on a surface of the collision object, the one or more controllers are configured to:
  determine an angle between a first vector from the object vertex to a specific target point of the target object and a second surface normal vector at the object vertex;
  determine an inflation magnitude based on the angle; and
  determine an inflated position of the object vertex by multiplying the second surface normal vector by the inflation magnitude and adding the inflated position to an original position of the object vertex.

22. The system of claim 21, wherein the inflation magnitude decreases as the determined angle decreases.

23. The system of claim 19, wherein for determining the inwardly deformed position of the first vertex, the one or more controllers are further configured to:
  determine an inflated outer boundary corresponding to the collision object;
  determine an external collision boundary which is outwardly offset from the inflated outer boundary by a falloff width;
  determine an internal collision boundary which is inwardly offset from the inflated outer boundary by the falloff width; and
  determine an external intersection point at an intersection between the external collision boundary and the ray,
  wherein when the internal collision boundary does not intersect with the ray, the inwardly deformed position of the first vertex is based on a terminal point of an offset vector having an initial point at the reference position and the terminal point at a middle point between the reference position and the external intersection point, and
  wherein when the internal collision boundary intersects with the ray at an internal intersection point, the inwardly deformed position of the first vertex is based on a terminal point of an offset vector having an initial point at the reference position and the terminal point at a middle point between the internal intersection point and the external intersection point.

24. The system of claim 23, wherein the offset vector is attenuated based on a dot product of a ray vector from the external intersection point toward the internal element of the target object and a surface normal vector at the external intersection point, and the inwardly deformed position of the first vertex is at the terminal point of the attenuated offset vector.

* * * * *